United States Patent [19]

Reid

[11] 4,443,338

[45] Apr. 17, 1984

[54] CONVERSION OF PLUG FLOW AND COMPLETE MIX AERATION BASINS TO BARRIER OXIDATION DITCHES

[76] Inventor: John H. Reid, 7 Stansbury Ct., Fredericksburg, Va. 22401

[21] Appl. No.: 429,165

[22] Filed: Sep. 30, 1982

Related U.S. Application Data

[60] Division of Ser. No. 75,412, Sep. 14, 1979, Pat. No. 4,394,268, which is a continuation-in-part of Ser. No. 28,383, Apr. 9, 1979, Pat. No. 4,278,547, which is a continuation-in-part of Ser. No. 848,705, Nov. 4, 1977, abandoned, which is a continuation-in-part of Ser. No. 649,995, Jan. 19, 1976, abandoned.

[51] Int. Cl.³ .................................................. C02F 3/20
[52] U.S. Cl. ................................ 210/629; 210/194; 210/220; 210/926; 261/91; 261/93
[58] Field of Search .............. 210/628, 629, 926, 194, 210/220, 219, 195.3, 195.4, 903; 261/91, 93

[56] References Cited

U.S. PATENT DOCUMENTS

| | | | |
|---|---|---|---|
| 1,247,542 | 11/1917 | Jones | 210/926 |
| 1,643,273 | 9/1927 | Imhoff | 210/926 |
| 2,263,534 | 11/1941 | Aldridge | 261/93 |
| 3,671,022 | 6/1972 | Laird et al. | 261/93 |
| 3,760,946 | 9/1973 | Boler | 210/628 |
| 3,839,198 | 10/1974 | Shelef | 210/629 |
| 3,994,802 | 11/1976 | Casey et al. | 210/903 |
| 4,260,486 | 4/1981 | Reid | 210/220 |
| 4,278,547 | 7/1981 | Reid | 210/926 |
| 4,394,268 | 7/1983 | Reid | 210/926 |

FOREIGN PATENT DOCUMENTS

| | | | |
|---|---|---|---|
| 729 | of 1915 | United Kingdom | 210/926 |
| 166160 | 8/1974 | Hungary | 210/926 |

*Primary Examiner*—Benoit Castel
*Attorney, Agent, or Firm*—Marion P. Lelong; William H. Murray

[57] ABSTRACT

Methods are provided for converting both plug flow and complete mix basins of the prior art into barrier oxidation ditches. Circulator/aerators are described that can be prefabricated and dropped onto the floor of an existing basin so that, in combination with at least one partition, if needed, an endless channel is created with minimum disruption of the activated sludge process.

8 Claims, 32 Drawing Figures

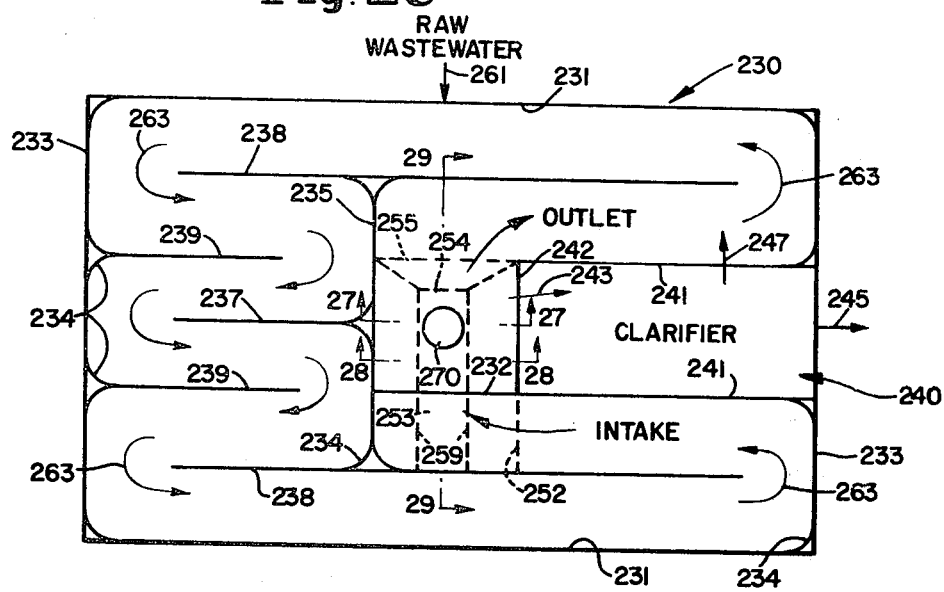
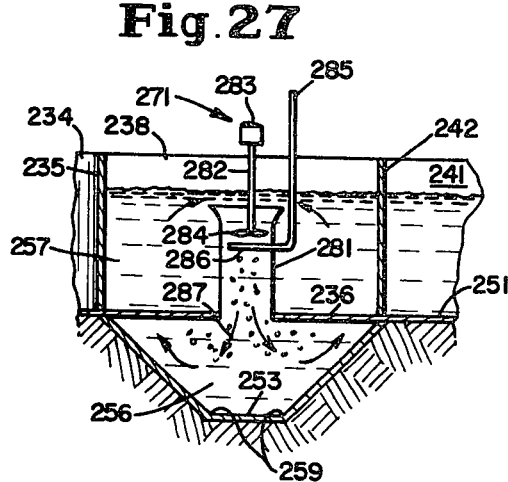
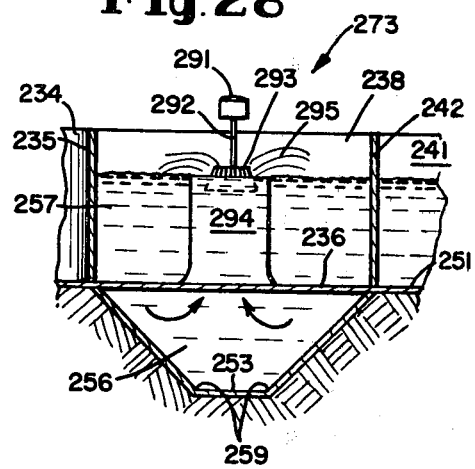
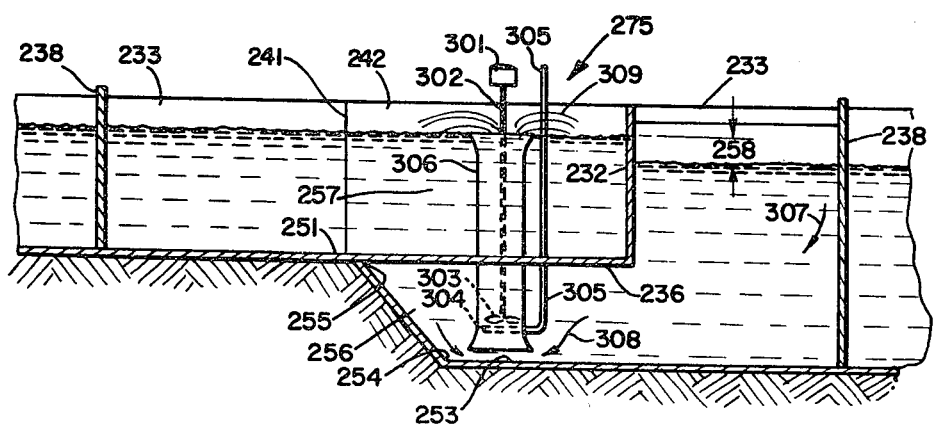

CONVERSION OF PLUG FLOW AND COMPLETE MIX AERATION BASINS TO BARRIER OXIDATION DITCHES

CROSS REFERENCE TO RELATED APPLICATIONS

This application is a division of Ser. No. 75,412 filed Sept. 14, 1979, entitled "Conversion of Plug Flow and Complete Mix Aeration Basins to Barrier Oxidation Ditches", now U.S. Pat. No. 4,394,268, which is a continuation-in-part of Ser. No. 28,383 filed Apr. 9, 1979, entitled "Conservation of Momemtum in a Barrier Oxidation Ditch", now U.S. Pat. No. 4,278,547 which is a continuation-in-part of Ser. No. 848,705, filed Nov. 4, 1977, entitled "Flow Control Apparatus and Process for an Oxidation Ditch", now abandoned, which is a continuation-in-part of Ser. No. 649,995, filed Jan. 19, 1976, entitled "Flow Control Apparatus and Method for Aerobic Sewage Treatment", now abandoned.

BACKGROUND OF THE INVENTION

1. Field of the Invention

This invention relates to gas-liquid contacting devices and the use of such devices in liquid treatment. The invention especially relates to methods and apparatuses for aeration pumping in activated sludge processes, particularly when conducted in oxidation ditches of racetrack or loop channel configuration.

2. Review of the Prior Art

Many liquid waste treatment processes, commonly termed aerobic processes, supply bacteria and other microorganisms with dissolved oxygen for treating aqueous wastes such as municipal sewage, tannery wastes, dairy wastes, meat-processing wastes, and the like.

One such aerobic process is the activated sludge process, in which the microorganisms are concentrated as an activated sludge to be mixed with incoming wastewater, which supplies food for the organisms. The apparatuses in which the activated sludge process is conducted comprise an aeration basin (reactor basin) and a final clarifier (settling tank). The aeration basin serves as a culturing basin in which to generate the growth of bacteria, protozoa, and othe types of microorganisms, so that they can consume the pollutants in the raw waste entering the basin by converting the pollutants into energy, carbon dioxide, water, and cells (biomass).

The activated sludge process is effective for controlling this conversion activity within the aeration basin, for settling the biomass within the clarifier, for overflowing the purified liquor or effluent from the clarifier to discharge, and for returning the settled biomass from the clarifier to the aeration basin. Thus the activated sludge process is a suspended-growth, aerobic, biological treatment process, using an aeration basin and a settling tank, which is capable of producing very pure, high quality effluent, as long as the biomass settles properly.

It can thus be compared to a fixed-growth process wherein the growth of the biomass occurs on or within a tower on plastic media or in a trickling filter on rocks packed therewithin.

The activated sludge process is represented by two prime mixing regimes, plug flow and complete mixing, which represent the opposite extremes of a continuum and almost infinite variety of intermediate mixing modes.

Plug-flow is characterized by use of relatively long, narrow aeration tanks or basins into which wastewater, with or without return sludge, is added at one end and from which it flows at the opposite end to enter a clarifier. The inflowing wastewater progressively moves down the tank length, essentially unmixed with the balance of the tank contents. Dissolved oxygen is generally added along the entire length of the basin. Intermediate mixing modes are sometimes termed semi-plug flow systems and include introduction of return sludge and/or wastewater at a plurality of positions along the length of the basin. A disadvantage is that plug-flow systems are inherently dominated by the inflowing wastewater, which volumetrically overpowers the returning activated sludge so that temporary or cyclic variations in wastewater characteristics, such as unusually large quantities of materials poisonous to microorganisms, can cause shock loadings that can at least temporarily inactivate the system.

Plug-flow systems are characterized by a dissolved-oxygen gradient. The dissolved-oxygen content is low at the entrance to the elongated basin, where raw waste and activated sludge are generally combined, and increases to a high level at the discharge end of the basin where the pollutants have been substantially consumed. However, plug-flow systems are not operated to include an anoxic zone within the basin.

In addition to its oxygen gradient, a plug-flow system is also characterized by a gradient in oxygen uptake rate of its mixed liquor. The rate is necessarily highest at the inlet end of the plug-flow aeration basin, lowest at the outlet end, and progressively decreasing along its length because the food supply steadily decreases from the inlet end to the outlet end.

Complete-mix systems are designed so that if samples are taken simultaneously over the basin area, the measured properties are essentially uniform as a theoretical aim. As one of these properties, the dissolved-oxygen content (D.O.) is maintained as uniformly as possible at an average dissolved-oxygen content of 2.0 mg of $O_2/l$. In practice, the D.O. concentration is usually not uniform because higher D.O. concentrations are found closer to the aerators and to the liquid surface (particularly if surface aerators are used) and because lower D.O. concentrations are found near the sides and the bottom of the basin.

Complete mixing is commonly conducted in round or square tanks into which incoming wastes are fed at numerous places. The contents of the tanks are sufficiently mixed to insure that the incoming wastes are rapidly dispersed throughout the tank, in contrast to plug-flow systems. The volume of mixed liquor in the tank is so much greater than the volume of the wastewater that the wastewater is overwhelmingly dominated by the tank contents. Thus there is a relatively uniform food/microorganism ratio existing in such complete-mix tanks. Also, there is a uniform concentration of mixed liquor-suspended solids (MLSS) to be found in complete-mix aeration tanks as contrasted with the variable concentration noted in the plug-flow and semi-plug flow tanks.

An endless fill-and draw system, using multiple baffles and air diffusers for propulsion and BOD removal in an activated sludge process, is described in U.S. Pat. No. 1,247,542.

As a variation of the activated sludge process, A. Pasveer of the Netherlands received Dutch Pat. No. 87,500 in 1951 for an aeration basin provided with a horizontally mounted rotor having brush surfaces for adding oxygen to sewage and impelling the surface of the sewage to flow in a closed-loop circuit within an ovally laid-out ditch having a racetrack shape in plan view. The ditch was intermittently operated; mixed liquor was circulated and aerated for a period of time, the liquor was then clarified by settling, excess sludge was removed, and wastewater addition and operation of the rotor were resumed. This invention, known as an oxidation ditch, is also disclosed in British Pat. No. 796,438.

In subsequent developments, the intermittently operated oxidation ditch became a continuous system by combining the ditch with a final clarifier so that the oxidation ditch itself became an activated-sludge aeration basin. In addition, the brush rotors were replaced with cage rotors having paddles or blades for chopping into the surface of the water and hurling a portion downstream to create surface aeration and induce the flow of the mixed liquor therebeneath.

A rotor equipped with blades mounted in a ditch having a depth greater than seven feet is illustrated in FIG. 1. Because of this depth, an inclined baffle is positioned about 4 to 15 feet downstream of the rotor in order to provide mixing of aerated liquor near the surface with unaerated liquor which is flowing near the bottom. The stratification that results from operating a ditch without baffles is shown in FIG. 2 as a cross section of a ditch equipped with six horizontal-shaft rotors for treating municipal sewage, rotors 2, 4, and 6 being idle. The hatched zones have a D.O. content of 0.5–1.5 mg $O_2$/l, and the unmarked liquor therebeneath has a D.O. content of less than 0.5 mg $O_2$/l, according to an article, published in 1976, entitled "Activated Sludge Process II—Nitrogen Removal, Phosphorus Removal, Aeration-Transfer of Pure Oxygen", by Wilhelm von der Emde, Institut fur Wasserversorgung, Abwasserreinigung and Gewasserschutz, TC Wein, A-1040 Wein, Austria.

In order to provide a system capable of treating high peak flow of wastewater and even excessive storm water flows, an oxidation ditch has been developed which has a channel of varied cross section and is aerated by a horizontal-shaft surface aerator supported on floats. This aerator is depicted in FIG. 3 and is described in U.S. Pat. No. 3,759,495. It is equipped with curved blades and a baffle which prevents the recirculation of freshly aerated fluid immediately back through the device a second time, the aerated fluid being lifted and revolved toward the baffle and then routed around either side of the device.

In another development, cage rotors have been replaced with surface aerators in the form of rotors having horizontally disposed shafts and large-diameter plastic discs mounted transversely thereupon. About forty percent of the surface area of these discs is immersed in the liquor. They have many holes therethrough and operate by rotationally dipping into the surface of the liquor to pump the liquor by hydraulic friction, to bring air therebeneath, and to lift liquor thereabove so that the covering layer of aerobic bio-mass absorbs oxygen and removes organic materials from the wastewater. FIG. 4 is an end view of a horizontal shaft disc aerator operating in an aeration channel.

A further improvement in oxidation ditch systems was described by 1970 in U.S. Pat. No. 3,510,110, comprising the location of a slow-speed mechanical surface aerator, having a vertically disposed shaft, at one end of a longitudinal partition that forms the straight channels of an oxidation ditch, the aerator being disposed close enough to the end of the partition and being so aligned therewith that the partition closes off the circuit on one side of the surface aerator. By providing a highly aerated surface condition and by impacting the circularly toroidal flow upon the longitudinal partition, the flow is converted into a slow spiraling flow downstream of the aerator.

FIG. 5 is a plan view and FIG. 6 is a sectional side view of such an oxidation ditch in which a surface aerator, mounted vertically and close to the dividing wall, creates a complete-mix aeration zone throughout the end of the ditch surrounding the aerator, transfers dissolved oxygen to the mixed liquor, and imparts sufficient velocity to suspend 4,000 mg/l of solids.

Another development that has been principally used in very deep oxidation ditches is the directional mix jet aerator system (eddy jet) which utilizes a plurality of subsurface ejector aerators which are connected to a transversely disposed header at the bottom of the channel as described in U.S. Pat. No. 3,846,292. This system is shown in FIG. 7 as a circular open-channel oxidation ditch having four headers which are connected to a blower and a submersible pump. The mixing pattern is shown as a section through a header and the surrounding mixed liquor in FIG. 8.

U.S. Pat. No. 3,900,394 describes a circuit-flow oxidation ditch having a vertically mounted, impeller-type mechanical surface aerator at one or both ends which emphasizes the use of an oxidation ditch for denitrification in an activated sludge extended aeration process. At a loading of 6000–8000 mg/l of mixed liquor suspended solids and at a depth up to 14 feet, this system is described as capable of maintaining suspension of the solids throughout a channel length of up to 900 feet.

It is pertinent to note that a conventional circuit-flow oxidation ditch of the prior art operates as a complete-mix system except that its D.O. gradient is characteristically plug-flow. Circulation of the entire basin contents during each cycle, while admixing the mixed liquor with the relatively minor stream of inflowing wastewater, ensures such complete-mix conditions.

Although it could be stretched out so that its racetrack or looped channel would be a mile in length, for example, so that the circuit flow in its channel would be comparable to that of the inflowing wastewater in volume, such as 1:1 to 3:1 (the latter being a dilution ratio for settled sewage in U.S. Pat. No. 1,643,273 of Imhoff, for example), thereby simulating a true plug-flow activated-sludge system, it would then be subject to shock-load effects, the food-to-microorganism ratio being so high that the microorganisms could readily be overwhelmed by incoming poisons or other changes in the food situation. Preferably, therefore, an oxidation ditch is sufficiently short that its channel flow of mixed liquor is ample to dilute the inflowing wastewater by volume ratios of 100:1 to 200:1 or greater, whereby the inflowing wastewater is completely dominated volumetrically by the mixed liquor in the ditch and the food-to-microorganism ratio is low enough that the microorganisms can handle any reasonable change in food properties, thereby simulating a true complete-mix system.

At such desirable volume ratios, an oxidation ditch can be designed to operate with recycled sludge within its channel on a food-to-microorganism ratio (F/M) by weight that varies over a possible range of 0.01 to 5.0, depending upon space, cost, and process design requirements, by varying the concentration of microorganisms, expressed as mixed liquor suspended solids (MLSS), flowing within its channel. If operating at a low F/M ratio of 0.01–0.2, it is an extended aeration system, producing small quantities of sludge. If operating at a medium F/M ratio of 0.2–0.5, it is a conventional system. If operating at a high F/M ratio of 0.5–2.5, it is a high-rate activated sludge system, producing large quantities of sludge. Moreover, it can even be operated as an aerated lagoon with no recycle sludge at F/M ratios above 2.5, but it is then not operating according to the activated sludge process and is therefore not herein defined as an oxidation ditch.

An oxidation ditch may also shift through a wide F/M range, representing all three of these systems, as it begins operation as a high-rate activated sludge system, with no built-up sludge, and gradually builds up its recycled sludge to a mixed liquor suspended solids (MLSS) content of 3,000 mg/l where extended aeration can generally be considered to begin. In general, an oxidation ditch is considered for design purposes to exist when the MLSS content reaches about 1500 mg/l, because at lower levels the size of the ditch would have to be excessive, but the principles of its operation are nevertheless applicable at much lower MLSS levels, such as at 1,000 mg/l.

It is significant that increasing the concentration of the microorganisms increases the total amount of oxygen used in an oxidation ditch of given volume and necessitates a higher flow velocity to maintain the greater mass of solids in suspension. At a given rate of food inflow (F), increasing the concentration (M) of microorganisms obviously decreases the F/M ratio. A change in the F/M ratio also affects the $O_2$ transfer rate (measured as pounds of oxygen per hour at process conditions) for which the ditch must be designed, as is known in the art. For example, using F/M to represent pounds of five-day biochemical oxygen demand, BOD(5), per pound of microorganisms, A/F to represent pounds of oxygen per pound of BOD(5), and A/M to represent pounds of oxygen per pound of microorganisms, the following approximate relationships are known in the art:

| Type of activated sludge process | Sludge age, days | Excess biological solids (cells) produced per lb. BOD(5) applied | Typical MLSS content, mg/l | F/M | A/F | A/M |
|---|---|---|---|---|---|---|
| High rate load | 0.5–2 | >1 | 500–1000 | 1.0 | 0.7 | 0.7 |
| Conventional load | >2 <6 | 1 > 0.35 | >1000 <3000 | 0.3 | 1.0 | 0.3 |
| Extended aeration | >6 >20 | <0.35 >0.2 | >3000 <5000 | 0.1 | 1.2 | 0.1 |
| Low load extended aeration (typical for oxidation ditch) | >12 | <0.2 | >3000 | 0.05 | 1.5 | 0.08 |

In order to remove nitrogen from a wastewater, in which it may be measured as total nitrogen or total Kjeldahl nitrogen, all systems using the wastewater as the chief organic carbon source for denitrification employ an alternating aerobic-anoxic sequence of stages, without intermediate clarification, to effect total nitrogen removal while attempting to avoid ammonia nitrogen bleedthrough. An oxidation ditch can be used for this purpose by controlling the level of aeration so that the mixed liquor is recirculated many times through alternating aerobic and anoxic zones prior to discharge from the channel of the ditch. To operate effectively, however, it is important that both zones be uninterrupted; i.e., aeration should occur at a single location immediately preceding the aerobic zone and should not recur until at least the end of the anoxic zone. If aeration occurs at only one location, so that there follows downstream thereafter one and only one aerobic zone, one and only one anoxic zone, and, if desired, an oxygen-deficient zone within the channel of the ditch, it is herein defined as point-source aeration. If there are multiple zones of each type, there is "multi-source aeration".

"Point-source aeration", "point-source mixing", and "point-source propulsion" are terms signifying that these three properties (hereinafter generally termed "point-source treatment") each originate at a single location within the channel of an oxidation ditch, in contrast to multiple locations therefor.

It is desirable that all of the mixed liquor of an oxidation ditch be homogeneously mixed with the inflowing waste, with the return sludge, and with an oxygen-containing gas which is hereinafter considered to be air. All three of these mixing operations can be simultaneously conducted, any two can be simultaneously conducted, or each can be separately conducted as either point source or multi-source operations.

When the mixed liquor is mixed with air, oxygen is dissolved in (i.e., transferred to) the mixed liquor. With respect to energy consumption, it is important whether such transfer is merely to a portion of the mixed liquor or to all of it. If the former, this portion must be aerated relatively intensively in order that after blending there will be the desired $O_2$ content; it is herein termed heterogeneous aeration. If the latter, it is termed homogenous aeration which is herein specifically defined as the homogenous transfer of all required process oxygen into all of the mixed liquor of an oxidation ditch by direct-contact aeration. Either homogenous or heterogenous aeration can be point source or multi-source.

In all oxidation ditches of the prior art, the functions of aeration and propulsion of the mixed liquor are combined in a single device which is installed so that it contacts and mixes merely a portion of the mixed liquor with air. This device may be a horizontally shafted surface aerator, a vertically shafted surface aerator, or a single header of a directional mix jet aerator. A vertically shafted surface aerator may be high speed or low speed, and both horizontally and vertically shafted surface aerators may be fixed or floating. Such a device is hereinafter generally designated a pump/aerator.

Point-source propulsion signifies that all propulsive energy necessary for generating adequate velocity for all of the mixed liquor in the entire ditch is disposed at one location. The amount of this propulsive energy is roughly comparable to hydraulic head and can be measured as the length of channel between aerators. In the prior art, it is believed that directional mix jet aerators are capable of subsurface propulsion of the mixed liquor for 200–300 feet, that horizontally mounted surface aerators are capable of propelling the mixed liquor for 200–500 feet between pump/aerators, and that vertically mounted surface aerators can propel the mixed liquor at adequate velocities for up to 900 feet between pump/aerators when the concentration of mixed liquor suspended solids exceeds 3,000 mg/l or ppm.

It is a self-evident fact in the prior art that the pump/aerators are additionally limited not only as to the length of channel between pump/aerators but also as to volumetric capacity or volume of flow within the channel, commonly defined as circulation rate in cubic feet per second or cubic meters per hour. The result is that in a large oxidation ditch (which is typically of looped channel configuration) the pump/aerators must be installed at intervals along the channel to operate in series, creating multiple aerobic and anoxic zones. Because of the multiplicity of the zones, it is relatively difficult to control the respective volumes of the aerobic and anoxic zones.

Using the oxidation ditch 20 shown in FIG. 9 as a theoretical example of point source aeration and point-source propulsion, pump/aerator 21 divides its channel into intake channel 22 and discharge channel 23. Mixed liquor flows translationally in direction 30. Mixed liquor 24 is withdrawn to a clarifier which separates it into clarified liquor and settled sludge 25. Wastewater inflow 26 may be disposed within intake channel 22 but is preferably located upstream thereof within anoxic zone 28 which stretches from end 31 of aerobic zone 27 to its end 36. Aerobic zone 27 is considered to begin at pump/aerator 21.

Aerobic zone 27 can be operationally defined as beginning with the initial transfer of dissolved oxygen into the mixed liquor and as ending with the dissolved oxygen content (D.O.) dwindling to 0.5 mg/l at end 31. The length of aerobic zone 27 is determined by the input food supply, the concentration, mass, and type of microorganisms that are available, the D.O. content at the beginning of the zone, the K-rate or B.O.D. removal rate of the biomass, the $O_2$ uptake rate of the biomass, the type of food (soluble and insoluble), the velocity of flow 30, and the temperature of the mixed liquor.

Anoxic zone 28 is characterized by having 0.0 to 0.5 mg/l of dissolved oxygen but is herein defined as the oxygen-depleted zone of activity for the heterotrophic facultative (denitrifying) bacteria and autotrophic (denitrifying) bacteria which obtain their needed oxygen from nitrate anions (liberating nitrogen as $N_2$) and their food from organic carbon or $H_2S$. The organic carbon is available in: (1) the inflowing wastewater, (2) the cell biomass in the mixed liquor, or (3) the organic carbon adsorbed by the biomass of the mixed liquor. Theoretically 62.5 percent of the oxygen required for nitrification can be used for B.O.D. removal by denitrifiers, thus reducing power consumption for oxygenation.

As oxidation ditches are commonly designed for denitrifying at the present time, end 36 is apt to coincide with pump/aerator 21, and anoxic zone 28 can be volumetrically defined as the difference between the total channel volume and the volume of the aerobic zone. In such a commonly occurring situation, a downstream movement of end 31 to position 33 causes anoxic zone 27 to become shorter and smaller so that denitrification may become less complete, depending upon mixed liquor temperature and nitrate concentration in the mixed liquor at the beginning of the anoxic zone.

If, however, the ditch is large enough that anoxic end 36 is spaced from pump/aerator 21, movement of aerobic end 31 to position 33 causes anoxic end 36 to move upstream to position 37, and movement to position 33 also causes a downstream movement to position 38 without diminishing the volume of anoxic zone 28.

The volume between end 36 and pump/aerator 21 is herein defined as oxygen-deficient zone 29 which is characterized as having a D.O. of 0.0 mg/l (no measurable D.O. and no oxygen present in the form of nitrates) through which aerobic and facultative microorganisms circulate. Such an oxygen deficiency causes an oxygen-starved condition in the mixed liquor which is believed to create a "luxury" uptake rate of oxygen when initial contact of the microorganisms occurs with dissolved oxygen or even with undissolved air bubbles or undissolved oxygen. It is believed that this luxury rate occurs because the microorganisms adsorb oxygen with great avidity, immediately absorb the adsorbed oxygen to replenish their systems, and then promptly adsorb a further supply of oxygen in a normal manner.

The practical meaning of point-source treatment is that the volume of aerobic zone 27 can be controlled simply by varying the air or oxygen supplied to the mixed liquor by the point-source aeration device, thereby causing anoxic zone 28 merely to shift position if the oxidation ditch is long enough. Because the wastewater load to an oxidation ditch is typically subject to change on a daily, weekend, weekly, and/or seasonal basis, it is important to be able to control the respective lengths 34, 35, 39 of aerobic zone 27, anoxic zone 28, and oxygen deficient zone 29 in order to maximize BOD(5) removal and $N_2$ removal by the nitrifiers and denitrifiers and thereby minimize the amount of oxygen that must be transferred by the point source aeration device. Point-source aeration and separately operated point-source propulsion greatly simplify such control.

In general, when an attempt is made to operate an oxidation ditch of the prior art with a single pump/aerator to aerate, mix, and propel the mixed liquor translationally through the channel of the ditch, the following problems, stated briefly, are typically encountered:

(1) a single pump/aerator cannot generate sufficient hydraulic head to pump the mixed liquor at an adequate circulation rate to produce and maintain a flow velocity that is high enough around the entire ditch to keep mixed liquor solids in suspension when MLSS concentration exceeds 3,000 mg/l and ditch length exceeds: (a) 900 feet and a vertically mounted surface aerator furnishes surface aeration, (b) 300–500 feet and a horizontally mounted rotor furnishes surface aeration and (c) 200 feet and diffusers or directional mix jet aerators furnish subsurface aeration.

(2) two or more pump/aerators cannot be concentrated (to operate as pump/aerators in parallel) in sufficiently close proximity for generating this necessary head at an adequate circulation rate and for transferring adequate oxygen at one point in an oxidation ditch to a mixed liquor containing more than 3,000 mg/l MLSS when the length of the endless channel exceeds 200–900 feet for specific aerators as previously set forth in (a)–(c) of (1);

(3) the dissolved-oxygen content of the mixed liquor cannot be changed without simultaneously changing its flow velocity since the channel circulation flow rate and velocity and $O_2$ transfer rate are dependently related because they are imparted by the same device;

(4) an excessive energy price must be paid for heterogeneous aeration which is herein defined as intensively contacting, pumping, and aerating a portion of the mixed liquor and then blending the contacted-flow portion with the induced-flow portion, which is flowing past the aerator without receiving oxygen, to produce the desired average D.O. content in the mixed liquor;

(5) energy is wasted when prior art devices attempt to re-aerate freshly aerated mixed liquor that has been back-mixed into the intake of the aerator;

(6) When pumping and transferring oxygen to the mixed liquor by prior art aeration devices, it is not possible to compensate for depth variations beyond ±one foot (except jet aerators as shown in FIGS. 7 and 8 and diffusers combined with baffles) without using floating devices for the aerators; and (7) aeration devices of the prior art are highly susceptible to icing and other cold weather problems (except jet aerators as shown in FIGS. 7 and 8 and diffusers combined with baffles), because surface aeration is employed.

These problems associated with prior art oxidation ditches are discussed in detail as follows with reference to FIGS. 10–16 of the drawings:

(1) Inadequate hydraulic head for entire ditch.

This problem is created by the prior art attempting to conserve the momentum of the circulating mixed liquor by mounting the pump/aerator so that it interferes with the flow of this mixed liquor as little as possible and pumps a relatively small portion of the total flow. For example, the blades of one type of rotor dip into the surface of the mixed liquor to a depth of 4–12 inches, while the underlying liquor flows past undisturbed throughout a depth of 4–14 feet, minus the depth of blade penetration. After blending, as by means of an inclined baffle as seen in FIG. 1, its motion may be said to be "induced" by the energy in the contacted-flow portion. If hydraulic friction with the bottom and sides of the channel is sufficiently great downstream of the rotor, there is no available means to generate the necessary hydraulic head that will force the blended portions (i.e., the total flow) to move at a velocity sufficient to sustain its load of suspended solids until it returns to the rotor unless the oxidation ditch is a short one (e.g., 200–900 feet, depending on the type of aerator as previously set forth, when the MLSS concentration exceeds 3,000 mg/l, in (a)–(c) of (1).

(2) Inability to group pump/aerators in close proximity.

If point-source treatment is to be maintained in a large oxidation ditch, it is necessary to increase horsepower input or to widen the channel and place two or more pump/aerator devices side by side or in otherwise close proximity in order to obtain adequate circulation rate. However, the devices of the prior art cannot be built to operate at more than 100 to 150 horsepower, depending upon the type of aerator, and are not adapted to operate in close proximity for pumping in parallel. Thus the only alternative is to lengthen the ditch, in order to obtain adequate ditch volume and the desired F/M ratio, and then to install a plurality of spaced-apart single pump/aerators furnishing multi-source aeration and multi-source propulsion.

(3) Simultaneous change of dissolved-oxygen content and flow velocity.

The first three problems are closely interrelated and are discussed together in detail herein because any change in: (a) depth of submergence or speed of rotation for surface aerators or impellers or (b) liquid pumping rate or pressure of compressed air for jet aerators will simultaneously cause changes in both the D.O. content and the flow velocity of the mixed liquor. Such changes will be in proportion to the energy input to the pump/aerators. Nevertheless, variations in mixed liquor temperature or of inflowing wastewater characteristics, such as BOD(5) content or nitrogen content, may require, for example, an increase in D.O. content and a decrease in flow velocity.

In consequence, in a prior art oxidation ditch employing multi-source aeration from a plurality of spaced-apart pump/aerators, the lengths of the aerobic and anoxic zones may tend to vary according to inflowing wastewater and temperature conditions, but the fixed locations of the pump/aerators may inhibit flexible operation in accordance therewith. For example, as indicated in FIG. 10, conveniently spaced-apart rotor aerators 41 are often located, at least temporarily, within an anoxic zone 43 or are otherwise improperly spaced apart between aerobic zones 42 and anoxic zones 43 for proper nitrification/denitrification of the wastewater when utilizing organic carbon in the wastewater as the hydrogen acceptor.

Thus, rotor-equipped oxidation ditches have been operated for nitrification/denitrification by shutting down one or more rotors in order to obtain sufficiently long anoxic zones while hopefully retaining sufficient translational velocity to maintain the biomass in suspension. This procedure has been used, for example, at the Vienna-Blumenthal plant in Vienna, Austria, as discussed in "Process Design Manual for Nitrogen Control", October 1975, pages 5-42 through 5-45, which is available from the Office of Technology Transfer, U.S. Environmental Protection Agency, Cincinnati, Ohio 45268.

As stated on pages 5-48 of the EPA "Process Design Manual for Nitrogen Control":

"It has been found that the cage aerators which are typically employed in the oxidation ditch are not well suited to nitrogen removal applications. The cage aerator is not capable of simultaneously mixing and maintaining DO control; too much oxygen is imparted to allow development of alternating aerobic and anoxic zones while maintaining sufficient ditch velocities (one fps or 0.30 m/s) for prevention of settling of solids in the ditch. In one case, the problem was solved by providing separate submerged propellers for mixing which allowed the cage rotor to be managed for DO control alone."

In a large oxidation ditch employing the Carrousel system (slow speed, vertically shafted surface aerators), requiring over 100–150 horsepower for supplying the process $O_2$ requirement, multi-source aeration is obtained by arranging the ditch to include several looped channels which are connected by channel turning points or bends. A vertical-shaft surface aerator 44 is installed in two or more of these bends, as indicated in FIG. 11. Nitrification and denitrification are controlled by turning off or cycling on and off one or more aerators, by varying the speed of selected aerators, or by varying the submergence of the aerators in order to control the translational flow and the lengths of the aerobic and anoxic zones 45, 46.

The directional-mix jet aerator system also appears to be propulsion limited because banks of headers 47 are typically spaced around an oxidation ditch at short intervals, as indicated in FIG. 12. The relatively high proportion of induced flow produces relatively short aerobic zones 48 and anoxic zones 49 as the mixed liquor moves counterclockwise through the channel. This system requires excessively high blower pressure to eject air at the bottom of a deep channel and also requires the operation and maintenance of a plurality of pumps to inject mixed liquor through the submerged jets for entraining the compressed air.

In the comparatively sized oxidation ditches of FIGS. 10-12, the spaced-apart aerators act as series pumps, but the velocity of mixed liquor flow does not change much in proportion to the number of units in operation. Referring to FIG. 10, the four 75-hp rotor aerators are each sized to supply about one-third of the total oxygen demand. Referring to FIG. 11, the three 100-hp low-speed surface aerators are each sized to supply about one-half of the total oxygen demand. Referring to FIG. 12, the six headers (each of which is designed to supply one fourth of the total oxygen demand) are individually connected to a 14-hp pump and are all connected to a 100-hp central compressor and one 100-hp standby compressor.

(4) Excessive energy consumption for heterogenous aeration.

This problem is related to the propulsive limitation, the circulation rate limitation, and the aeration capacity limitation. The first three problems are also closely interrelated because the contacted-flow portion (actively pumped directly by the aeration device) not only receives all of the propulsive energy from the pump/aerator but also receives all of the dissolved oxygen by being contacted by or mixed with air, whereas the induced-flow portion directly receives neither propulsion energy nor oxygen. Therefore the final or maximum dissolved oxygen (D.O.) content of the contacted-flow portion must be great enough that the post-blended D.O. content of the total flow will be at the desired level, as indicated schematically in FIG. 13. The percentage of the total flow that is represented by the intensively aerated contacted-flow portion determines the maximum D.O. content to which this contacted-flow portion must be aerated in order to obtain a desired D.O. content in the blended flow.

The practical consequence of heterogeneous aeration is that, in general, when a pumped portion is intensively aerated and then blended with an induced-flow portion which is not aerated to produce a desired average dissolved-oxygen content, an energy price must be paid. The reason therefor is that when oxygenating water with air, the necessary driving force increases non-linearly as the dissolved-oxygen content of the water increases, as may be appreciated by considering the two-film theory of gas transfer.

This theory is based on a physical model in which two films exist at the gas-liquid interface. The two films, one liquid and one gas, provide the resistance to the passage of gas molecules between the bulk-liquid and the bulk-gaseous phases. For transfer of gas molecules from the gas phase to the liquid phase, slightly soluble gases encounter the primary resistance to transfer from the liquid film. FIG. 14 schematically illustrates the two-film gas transfer theory.

The rate of gas transfer, in general, is proportional to the difference between the existing gas concentration and the saturation concentration of the gas in solution. In equation form, this relationship can be expressed as:

$$\frac{dC}{dt} = K(C_s - C)$$

where
C = existing gas concentration
t = time
$C_s$ = saturation concentration of gas
K = proportionality constant K includes the effect of the resistance of either or both films and is also a function of the area of liquid-gas interface that exists per unit volume of fluid.

Oxygen is a slightly soluble gas in water so that traversing the liquid film from $C_1$ to C in FIG. 14 is the main obstacle for the oxygen molecules. This situation may be thought of as a resistance to crowding by the oxygen molecules in the water; the more closely packed they become, the more strongly they resist the influx of additional molecules so that the change of concentration with time, dC/dt, decreases at a decreasing rate when a constant-volume system is subjected to a constant power input while mixing air with liquid.

Practical consequences of this phenomenon are illustrated in FIG. 15 which is a typical curve for oxygen uptake by water, using an upflow submerged turbine at constant power, without a draft tube, and with a compressed-air sparge beneath the deeply submerged turbine impeller (but with no upper impeller), within a large tank filled with deaerated tap water, dissolved oxygen concentrations being determined by the Winkler method and being corrected for cobalt ion content.

The decreasing slope of dissolved-oxygen concentration as a function of mixing and aerating time (at constant external power input) indicates that the water is increasingly resisting the attempted transfer of oxygen from the air bubbles. Thus if an intensively aerated portion, representing 33 percent of the channel flow by weight, contains 6.0 mg/l of D.O. and is blended with an induced-flow portion representing 67 percent of the channel flow by weight and containing 0.0 mg/l of D.O., the final blended dissolved-oxygen content is 2.0 mg/l at an average power input (measured in minutes) of 1.15 (corresponding to an average D.O. content of C = 3.0 mg/l as the contacted-flow portion is aerated from 0.0 to a maximum of 6.0 mg/l) as compared to 0.4 (in minutes), if the entire blended contents of the channel were homogenously aerated to a final homogenous D.O. content of 2.0 mg/l (corresponding to an average D.O. content of C = 1.0 mg/l as 100 percent of the channel flow is directly aerated from 0.0 to a maximum of 2.0 mg/l).

The manufacturer of the floating surface aerator shown in FIG. 3 has published a graph showing the cost (at an unknown date) for introducing 1,000 pounds of oxygen into water having various percentages of oxygen. The graph was developed to illustrate the benefits of adjusting horsepower input to the diurnal flow of municipal sewage as compared to the cost of using a steady horsepower input all during the day and the night. This graph is reproduced as FIG. 16.

Now consulting FIG. 16 for costs of oxygen transfer at average D.O. contents of 3.0 mg/l and 1.0 mg/l, $4.40 and $3.30 per 1,000 pounds of transferred oxygen are respectively obtained. The difference of $1.10 represents a 33 percent increase in power cost requirement for operation of a prior art oxidation ditch because of this practice of intensive aeration of a contacted-flow portion only and subsequent blending with an induced-flow portion. The smaller the portion of the total flow that is intensively aerated and the higher the final blended D.O. content that is desired downstream of a pump/aerator of the prior art, the higher the energy price that must be paid for such heterogenous aeration.

(5) Back-mixing.

When blade and cage rotors as seen in FIGS. 1 and 3 and disc rotors as seen in FIG. 4 are operated, they recirculate on their surfaces or in their holes or throw backwards towards their intakes much freshly aerated liquor from which the microorganisms have not had time to absorb the dissolved oxygen. Thus this recirculated liquor has an $O_2$ content that is characteristic of aerated water far along the curve of FIG. 15 where any additional input of oxygen meets increased resistance. The consequence is that energy is wasted by attempting to crowd in a supply of additional oxygen molecules. This practice is herein termed "back-mixing".

The manufacturer of the floating surface aerator shown in FIG. 3 was aware of this phenomenon and consequently provided the aerator with a variable-speed, horizontal-shaft rotor and an upstanding baffle and horizontally disposed splash pan behind the rotor "to prevent recirculation of freshly aerated fluid immediately back through" the rotor and in order to ensure that the rotor "is operating at all times at substantially its greatest efficiency, by receiving primarily that portion of the sewage liquid which has the lowest oxygen content".

As illustrated in FIGS. 5, 6, and 11, the Carrousel surface aerator hurls outwardly a large amount of liquor, air froth, and bubbles over the surface on its intake side, and this mixture is promptly drawn downwardly and swept toward the intake of the aerator. Such an intake would occur even if the aerator were equipped with a draft tube creating toroidal circulation. Indeed, the entire bend in the channel, within which such a vertically shafted surface aerator is mounted, is in a complete-mix state having a relatively uniform D.O. content and consequently an aerator intake that pulls in a mixed liquor with a D.O. content not far below that desired as the product of the aeration zone (the hatched area in FIG. 5).

The directional-mix jet aerator system that is shown in FIG. 12 is also subject to back-mixing, for it has been observed to be capable of recirculating into its intake a portion of the mixture of air bubbles and freshly aerated liquor ascending from its jets.

A schematic analysis of prior art practice with respect to back-mixing, intensive aeration of a contacted-flow portion, and no aeration of an induced-flow portion, followed by blending of the portions to produce the desired D.O. content, is presented in FIG. 13. This situation is inherent in prior art oxidation ditches because of:

(a) the lack of collecting or gathering means for forcing all of the mixed liquor at a selected low D.O. content to flow past the aerator, and (b) the lack of a means for inhibiting back-mixing of freshly aerated liquor into the pump/aerator intakes.

(6) Inability of fixed surface aerators to compensate for major depth variations.

Fixedly mounted rotor and disc aerators are highly sensitive to depth variations of even a few inches and typically possess no means for elevating or lowering their relatively massive bulks by more than a foot, so that floating assemblies, such as the aerator seen in FIG. 3, must be used when flow equalization is desired. Vertical-shaft surface aerators have been plagued by mechanical stresses to the shafts and shock-load difficulties for the impellers because of variable submergence. Submergence of all surface aerators, including the floating types, is deliberately varied only for desired changes in $O_2$ transfer, not for flow equalization or for velocity control. The oxidation ditches equipped with the floating horizontal-shaft rotors seen in FIG. 3, however, may be built with a cross-sectional configuration permitting considerable flow equalization.

(7) Inability of surface aerators to operate during adverse weather conditions.

All types of surface aerators, both fixed and floating, which have been installed in oxidation ditches have commonly been afflicted with aerosol spray and with severe icing on their surfaces during freezing weather. Only the directional-mix jet aerator is immune to weather conditions. Although the submerged turbine aerator (which is widely employed in aeration lagoons and complete-mix basins), is not affected by adverse weather conditions, it has not been used in oxidation ditches.

In summary, prior art oxidation ditches provide zones for nitrification and denitrification but are so limited by propulsion capability and/or circulation rate and/or aeration capacity that their aeration devices must be disposed sequentially (in series) throughout the ditch and be spaced at distances apart that are based upon propulsion capabilities and/or circulation rates and/or aeration capacities without regard to lengths of the nitrification and denitrification zones. In other words, they are characterized by inherent rigidity and are incapable of adjusting to wide variations in flow rates and temperatures.

One reason therefor is that in prior art oxidation ditches the same aeration apparatuses supply the dissolved oxygen and create both induced flow and contacted flow of the mixed liquor so that elapsed times for circuit flow, oxygen supply, and aerobic/anoxic volume fractions are interrelated. For example, if the D.O. in a prior art oxidation ditch is too high, the aerobic zone is too long. If the oxygen supply is cut back in order to correct this situation, the flow velocity is simultaneously reduced. Yet a minimum flow velocity is required in order to maintain the bio-mass in suspension.

All of these enumerated problems have been satisfactorily solved by the inventions disclosed in the parent abandoned applications, Ser. No. 649,995 and Ser. No. 848,705, which provide a barrier means in sealed combination with a pump/aerator for:

(1) dividing the mixed liquor in the channel of an oxidation ditch into an intake body and a discharge body, with the pump/aerator as the sole flow-through connecting means so that:

(a) flow of mixed liquor occurs only once each circuit flow through the pump/aerator, (b) back-mixing from the exit to the entrance of the pump/aerator is completely prevented, and
(c) none of the flow in the channel is induced flow;
(2) creating a differential head between the discharge body and the intake body on opposite sides of the barrier means and using it, particularly when the pump/aerator has no directional-flow discharge, for continuously moving the liquor in circuit flow through the channel from the discharge body to the intake body;
(3) providing a mounting means for the pump/aerator so that all types of aerators can be mounted anywhere within the channel;
(4) selectively providing controlled acceleration, uniform steady-state flow, and controlled deceleration for the liquor in the channel; and
(5) providing a means for controlling the lengths of the aerobic and anoxic zones, independently of the flow velocity, while disposing all aeration apparatuses at a single location within the channel to obtain point-source aeration and point-source propulsion.

Essentially, the inventions disclosed in the parent applications solve these problems by providing point-source aeration and mixing with a means for gathering ALL of the mixed liquor, and thereby all of the floc particles, into at least one treatment center or passageway wherein or at the entrance or exit of which at least one pump means and at least one aeration means are disposed, whereby homogeneous aeration occurs, the pump means and aeration means being independently operable when an axial-flow pump is used for propulsion and a separate device is used for aeration (e.g., diffusers, jet aerators, and surface aerators). These inventions are generally referred to hereinafter as a barrier oxidation ditch.

The barrier, when employed in a barrier oxidation ditch in combination with an aeration means and a pump assembly, is useful for selective acceleration and deceleration, for providing homogeneous aeration, for preventing backmixing, and for supporting an adequate hydraulic head in a desired volume of mixed liquor that can propel it through distances entirely beyond the capabilities of prior art oxidation ditches. Such a combination of a barrier and a pump assembly is herein termed a barriered circulator. When additionally combined with an aeration means, it is termed a barriered circulator/aerator.

A barriered circulator is herein defined as any combination of (1) a barrier means for forcing up to all of the mixed liquor to enter a discharge passage; and (2) a pump means for forcing mixed liquor to move through the discharge passage from an intake channel to a discharge channel. If an aeration means is additionally provided, the term used herein is a barriered circulator/aerator. If streams of raw wastewater and/or return sludge are connected to the discharge passage and no aeration is performed, the term used herein is a barriered circulator/mixer.

A discharge passage is herein defined as a flow channel of smaller cross section than the endless channel of the oxidation ditch and through which the mixed liquor moves past a barrier disposed across the endless channel. A discharge passage includes a discharge duct, a discharge slot, a vertically disposed draft tube, and the like.

There are large numbers of plug flow systems and complete mix systems which are in operation at the present time within the United States and which are beset with numerous problems, generally including icing during cold weather, inadequate BOD reduction, very little ammonia removal and/or denitrification, and excessive sludge production. Many of these problems could be obviated or at least considerably decreased by conversion to a barrier oxidation ditch system, as disclosed in abandoned Ser. No. 848,705.

However, it is an expensive operation to dig to a depth adequate for a U-shaped draft tube surrounding an axial-flow impeller. A simpler apparatus that can be prefabricated and pre-assembled is accordingly needed for conversion of either a complete-mix basin or a plug-flow basin to a barrier oxidation ditch without having to excavate a portion of a basin to a greater depth. Further, a method for effecting such conversion without having to drain the basin and lose the aerobic effectiveness of the mixed liquor is similarly needed.

SUMMARY OF THE INVENTION

It is therefore an object of this invention to provide a barriered circulator that can be prefabricated and pre-assembled for operation as a unit within the endless channel of an oxidation ditch.

It is additionally an object to provide such barriered circulators that utilize a downdraft impeller and a separate aerating means and, alternatively, that utilize a vertically mounted surface aerator as the combined pump and aerator.

It is also an object to provide such prefabricated and pre-assembled circulators that can be lowered into operating position onto the floor of an existing wastewater treatment system without drainage thereof.

It is further an object to provide a method of converting an existing system to a barrier oxidation ditch system by selectively positioning on the floor of the existing system a plurality of partitions and, in combination, a barriered circulator.

In accordance with these objects and principles of this invention, a barriered circulator that can be prefabricated and pre-assembled in combination with an aerator and an axial-flow downdraft pump, is herein provided for lowering onto the floor of an existing system. Other barriered circulators that include a stepped barrier and a vertically mounted surface aerator or a vertically mounted downdraft or updraft submerged turbine are also provided. Additionally, "dual-baffle aerators" are provided as another form of barriered circulator, comprising a stepped barrier that includes a pair of concave barriers and a horizontally disposed barrier, which is connected to and disposed between the concave barriers and has a central opening therein. A vertically mounted pump/aerator is mounted in flow connection with the opening.

Further, partitions and methods for placing them in a prior art basin and for combining them with a barriered circulator, with minimum expense and disruption of the activated sludge process, are provided for converting such a basin into a barrier oxidation ditch.

A barriered circulator of this invention is used within an endless channel containing mixed liquor and having a bottom and opposed sides. A circulator may be a circulator/mixer which additionally comprises one or more inlets for other streams, such as raw wastewater influent or return sludge, which generally discharge into the draft tube, upstream of the pump. A circulator may also be a circulator/aerator which additionally comprises an aeration means for dispersing air into the mixed liquor to form freshly mixed liquor as the downstream liquor. A circulation/aerator, however, may also include one or more inlet streams and thus may have a secondary admixing function in addition to its primary aerating function. A barriered circulator/aerator comprises:

A. a barrier separating the mixed liquor within the vicinity of the circulator into upstream liquor within an intake channel and downstream liquor within a discharge channel;

B. a passage means, defining a flow passage, for connecting the upstream liquor to the downstream liquor;

C. a pump means for propelling all of the upstream liquor through the flow passage from the intake channel to the discharge channel; and D. an aeration means for dispersing an oxygen-containing gas (preferably air) into the upstream liquor to form freshly aerated mixed liquor, the aeration means being disposed to contact the upstream liquor after the upstream liquor has entered the flow passage and before the upstream liquor has become the downstream liquor.

The pump can include a submerged impeller which operates within a draft tube and is attached to a vertically disposed shaft attached to a motor. The draft tube in each barriered circulator of this invention is vertically disposed and can be either an updraft tube or a downdraft tube. The aerator is preferably an air sparge device disposed beneath the impeller or submerged turbine. To prevent flooding when the draft tube is a downdraft tube, the impeller should operate within a circular space along the sides of the downdraft tube; this circular space may be partially formed by a guide tube which is coaxially disposed within a downdraft tube.

The pump can alternatively be a surface aerator. However, a surface aerator as the combined pump and aerator must be used with an updraft tube.

The draft tube may or may not be sealably attached to the barrier. If the draft tube passes through and is sealably attached to the barrier, the passage means is generally formed entirely by the draft tube. If the draft tube is a downdraft tube, it is usually connected to an intake funnel.

The barrier may be a unitary member which is attached to the draft tube or it may be a stepped barrier, comprising a horizontally disposed barrier, which is attached to the draft tube, a first vertically disposed barrier attached to the upstream edge of the horizontal barrier, and a second vertically disposed barrier attached to the downstream edge of the horizontal barrier. If the draft tube is a downdraft tube, the first vertical barrier extends to the bottom of the channel and is sealably attached thereto, and the second vertical barrier extends at least to the surface of the mixed liquor, both vertical barriers and the horizontal barriers being also sealably attached to the opposed sides. If the draft tube is an updraft tube, the first and second vertical barriers are reversed as to direction.

The barrier which is attached to the draft tube may alternatively be a slanted barrier, extending as a single planar member from the bottom to the surface and having either the upstream liquor or the downstream liquor above the barrier. Such a barrier and attached pump assembly can be lowered onto the bottom of an endless channel and then tilted until the draft tube is disposed at a desired angle.

In a ducted-barrier circulator/aerator, the barrier may be a single planar member which is vertically disposed and attached to a discharge duct which is flow connected to the draft tube. A diffusion assembly is preferably also disposed within the discharge duct. The discharge duct has a closed end and an open end and is disposed horizontally and in parallel to the opposed sides of the channel; it is connected to the draft tube along one side and near its closed end which comprises a deflecting member for changing the direction of flow of the mixed liquor. Preferably, the barrier is sealably attached to the discharge duct near its open end, is vertically disposed, and is sealably attached to the bottom and sides of the endless channel. The diffusion assembly, for dispersing air bubbles into the mixed liquor, in addition to those admixed with the liquor by the air sparge device and impeller or turbine, is disposed close to the open end.

Preferably, the draft tube is a downdraft tube, and the pump comprises an impeller so that the open end of the discharge duct is the discharge opening for this preferred ducted-battier circulator/aerator. Thus, the pump assembly is surrounded by the upstream liquor. This entire circulator/aerator is preferably prefabricated and lowered onto the bottom of the endless channel.

However, it is feasible to reverse the direction of flow within the flow passage, particularly if a mechanical surface aerator or a submerged turbine is the combined pump and aerator. The intake channel and the upstream liquor are thus in flow connection with the open end of the discharge duct. So the upstream liquor initially contacts air bubbles from the diffuser assembly and is secondarily aerated when additional air bubbles are encountered below a submerged turbine and are then aerated a third time when splashed out of the funnel. If a surface aerator is used, secondary aeration occurs when the upstream mixed liquor is thrown out upon the surface of the downstream liquor.

BRIEF DESCRIPTION OF THE DRAWINGS

The invention may be more fully understood by referring to the drawings in which FIGS. 1-17, 21, 22, and 31 refer to the prior art, and FIGS. 18-20, 23-30, and 32 show various embodiments of this invention.

FIG. 9 is a plan view of a typical prior art oxidation ditch of sufficiently small size to possess point-source aeration and propulsion.

FIGS. 10-12 are plan views of typical prior art oxidation ditches of comparable size and shape which comprise three types of aerators furnishing multi-source aeration and propulsion.

FIG. 18 is a plan view of the basin of FIG. 17 after its conversion to a barrier oxidation ditch.

FIG. 19 is a detailed plan view of the barriered circulator/aerator assembly shown in FIG. 18.

FIG. 20 is a sectional elevation of the barriered circulator/aerator assembly of FIG. 19, looking in the direction of the arrows crossing the broken line 20—20 in FIG. 19.

FIG. 23 is a plan view of the same basin shown in FIGS. 21 and 22 after its conversion to a barrier oxidation ditch.

FIG. 24 is a plan view of the same aeration basin shown in FIGS. 21-23 with two additional partitions so that the channel which is created is narrower and approximately half again as long as the channel of FIG. 23.

FIG. 25 is a side and partially sectional view of the barriered circulator/aerator assembly seen in FIG. 24, looking in the direction of the arrows crossing the broken line 25—25 in FIG. 24.

FIG. 26 is a plan view of a rectangular complete mix aeration basin after its conversion to a barrier oxidation ditch system plus a clarifier. The barriered circulator/aerator comprises a pump/aerator, a stepped barrier, and an excavated intake body beneath the barrier.

FIG. 27 is a sectional elevation, looking in the direction of the arrows crossing the line 27—27 in FIG. 26, in which the pump/aerator is a downdraft submerged turbine and in which the direction of flow for the mixed liquor in the channel of FIG. 26 is reversed.

FIG. 28 is a sectional elevation, looking in the direction of the arrows crossing the line 28—28 in FIG. 26, in which the pump/aerator is an updraft low-speed surface aerator, the direction of flow in the channel of FIG. 26 being as shown therein.

FIG. 29 is a view similar to FIG. 28 in which the pump/aerator is an updraft submerged turbine, the direction of flow in the channel of FIG. 26 being as shown therein.

FIG. 30 is the same aeration basin seen in FIGS. 26-29 but with a pair of stepped-barriered circulator/aerators operating in parallel and with the clarifier extended partially outside of the basin. Each stepped barrier comprises a pair of concave barriers.

FIG. 32 is a plan view of the activated sludge plant of FIG. 31 after conversion into four barrier oxidation ditches.

DESCRIPTION OF THE PREFERRED EMBODIMENTS

Several embodiments of a circulator/aerator are described herein as unitary assemblies, each of which can be prefabricated and lowered into a plug-flow or complete-mix basin in combination with placing of partitions, if necessary, to create an endless channel which is divided in the vicinity of the assembly into an intake channel on its upstream side and a discharge channel on its downstream side.

EXAMPLE I

The conversion of a circular prior art plug-flow basin to a barrier oxidation ditch is shown in FIGS. 17-20. A similar procedure is feasible for converting oxidation ditches utilizing brush or blade rotors or vertically mounted low-speed mechanical surface aerators, for translational propulsion of the mixed liquor, into barrier oxidation ditches. In such basins, the step of forming the endless channel may merely require piping re-arrangements and removal of existing aerators.

Prior Art System

A ring-shaped, plug-flow aeration system pretreats a rendering industry wastewater by use of the activated sludge process. The prior system includes eight high-speed surface aerators which cause spray cooling and icing during the winter season in Illinois to such extent that the activated sludge process becomes inoperable. Moreover, there are frequent biomass upsets and consequent poor treatment which are caused by a shock loading effect resulting from improper, incomplete, and inadequate mixing of inflowing wastewater with the mixed liquor within the aeration ring. The wastewater has a very high and erratic five-day Biochemical Oxygen Demand, Ammonia-Nitrogen, Total Suspended Solids, and Oil & Grease values, so that such poor mixing is particularly apt to cause shock loading when one or more of these properties is at a peak. In addition, maintenance workers find it difficult to service and maintain the equipment because its surfaces are covered with sludge deposited from the spray. Conversion to a barrier oxidation ditch is suggested for relief of these problems.

Figure 1:
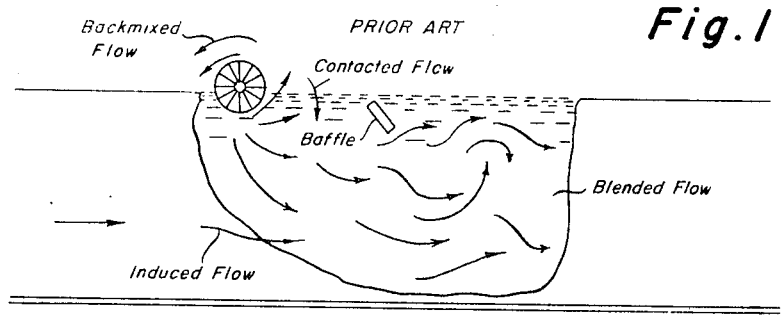
FIG. 1 is a sectional elevation of a horizontal-shaft rotor, with radially extending blades, which operates to a channel deeper than seven feet and requires a baffle at a downstream distance of 4-15 feet.
Figure 2:
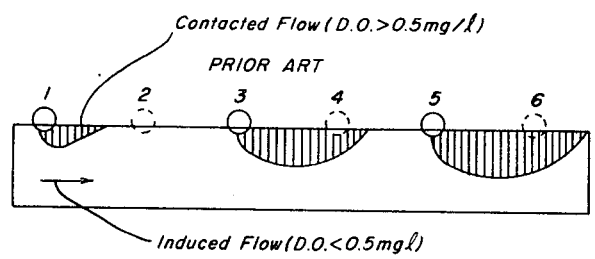
FIG. 2 is a sectional elevation of an oxidation ditch equipped with six horizontal-shaft rotors, alternate rotors being idle, in which hatched areas indicate zones having 0.5-1.5 mg/l of dissolved oxygen (D.O.) and unhatched areas indicate less than 0.5 mg/l D.O.
Figure 3:
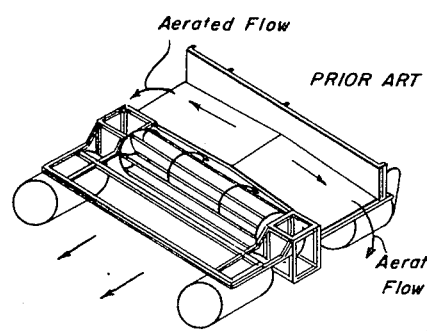
FIG. 3 is a perspective view of a floating surface aerator which is equipped with a horizontal-shaft blade rotor and a deflecting member or baffle to prevent recirculation of freshly aerated liquor under the rotor a second time for further aeration.
Figure 4:
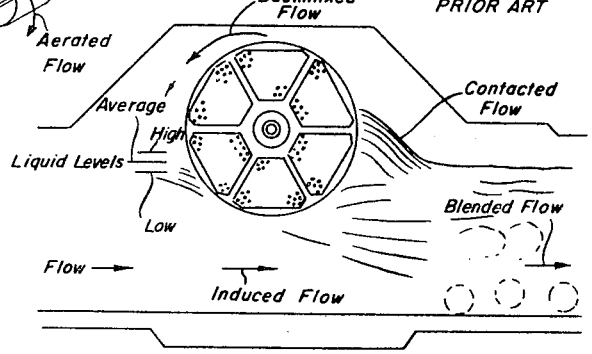
FIG. 4 is an end view of a horizontal-shaft disc aerator which rotates at the surface of mixed liquor in a channel of an oxidation ditch, the discs being provided with many holes which lift liquor into the air and bring air beneath the surface.
Figure 5:
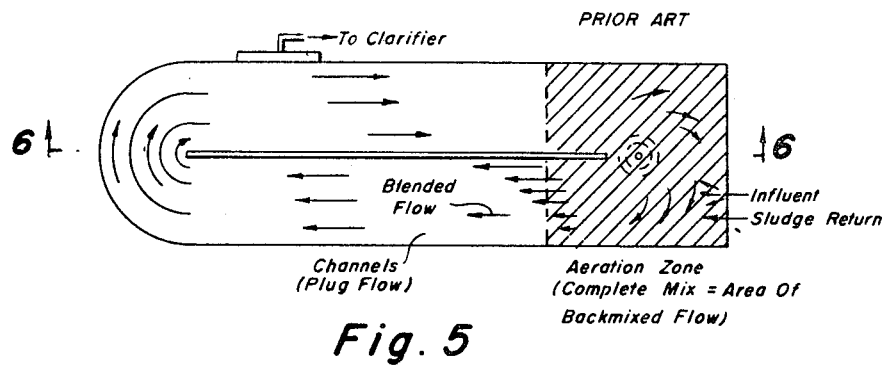
FIG. 5 is a plan view of an oxidation ditch of the Carrousel type in which a dividing wall forms two channels, and a single low-speed surface aerator, mounted vertically and close to the dividing wall, provides aeration, mixing, and propulsion of a sufficient flow in the channel for operation of the ditch (hatched areas indicate a complete-mix zone or back-mixed zone).
Figure 6:
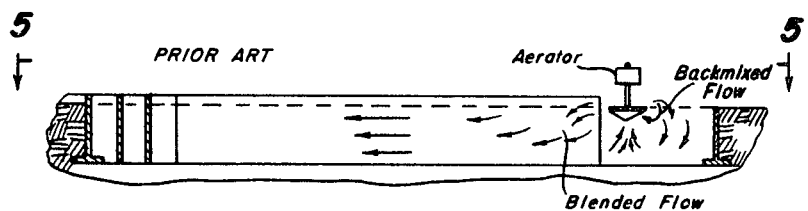
FIG. 6 is a sectional side view of the ditch and aerator seen in FIG. 5.
Figure 7:
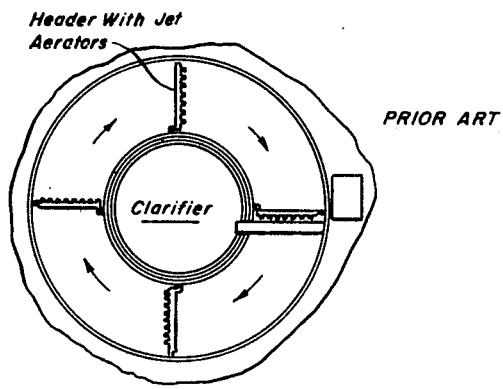
FIG. 7 is a plan view of a circular oxidation ditch in which an annular channel surrounds a circular clarifier. Four headers for directional-mix jet aerators are radially disposed in the channel and spaced at 90° intervals.
Figure 8:
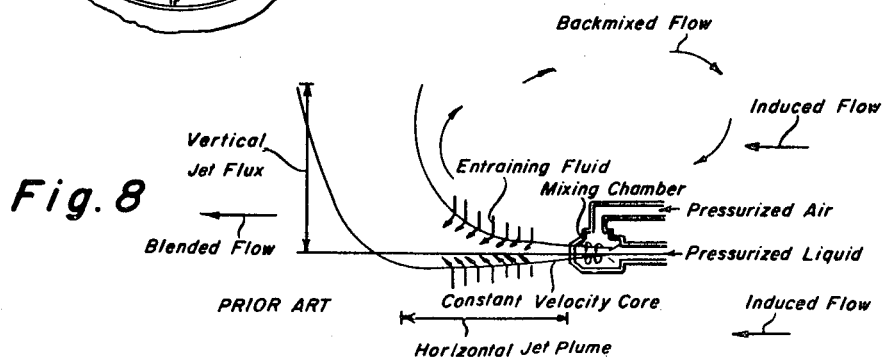
FIG. 8 is a sectional elevation through a single directional-mix jet aerator (eddy jet) to reveal its mixing pattern, back-mixing tendencies, and induced-flow characteristics.
Figure 13:
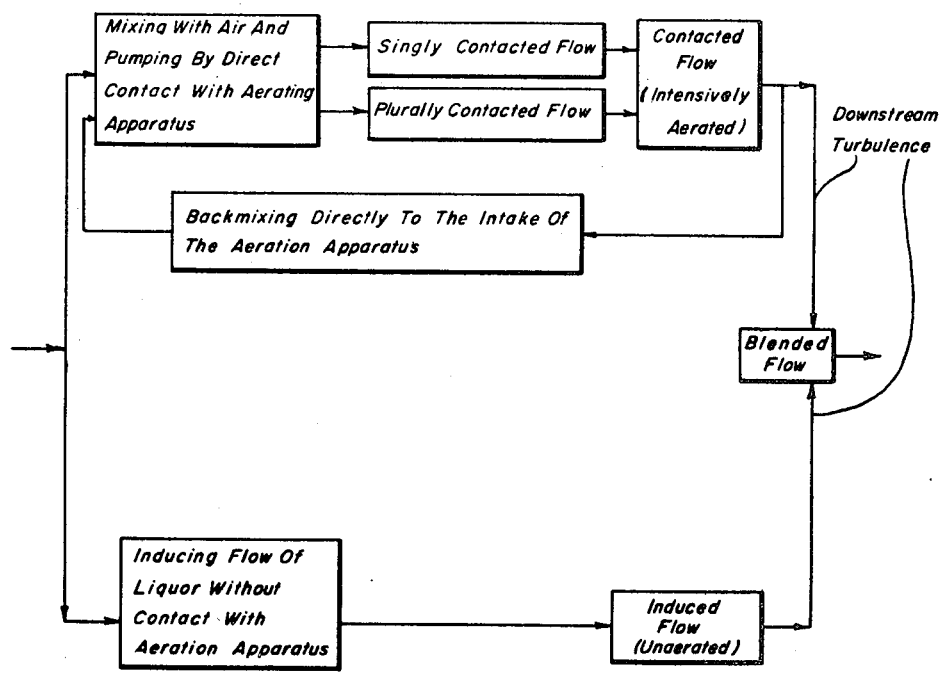
FIG. 13 is a schematic flow sheet that illustrates heterogenous aeration and back-mixing by prior art aerators in oxidation ditches.
Figure 14:
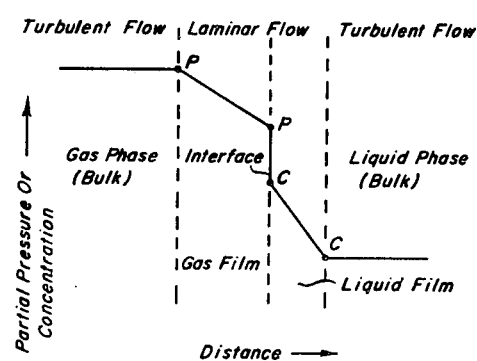
FIG. 14 is a schematic cross section illustrating the two-film gas transfer theory for transfer of gas molecules from the gas phase (e.g., an air bubble in mixed liquor) to the liquid phase.
Figure 15:
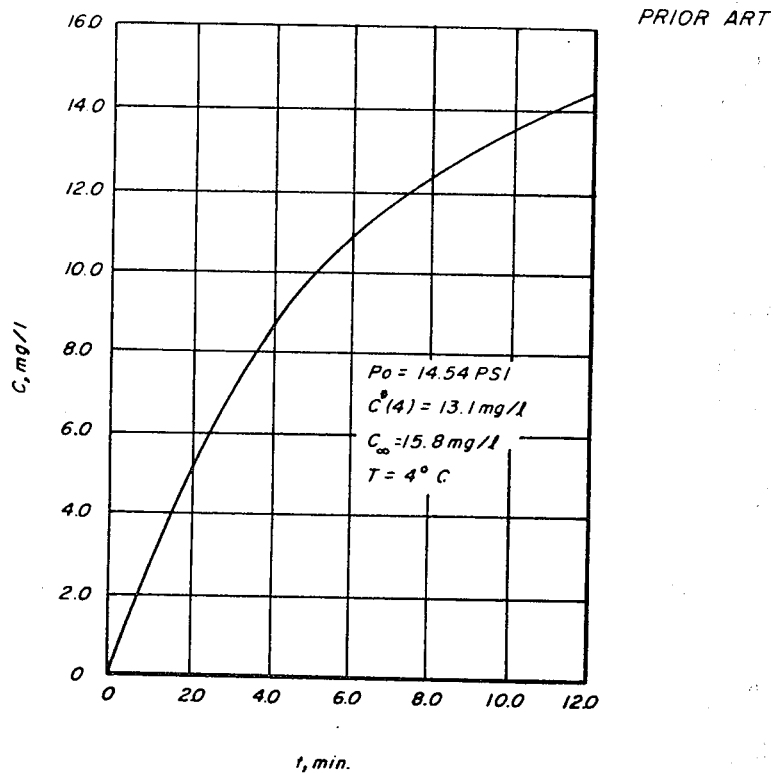
FIG. 15 is a graph showing the content of dissolved oxygen, in a large tank of water that is being agitated by a submerged impeller at constant power and with a compressed-air sparge therebeneath, versus commulative mixing time.
Figure 16:
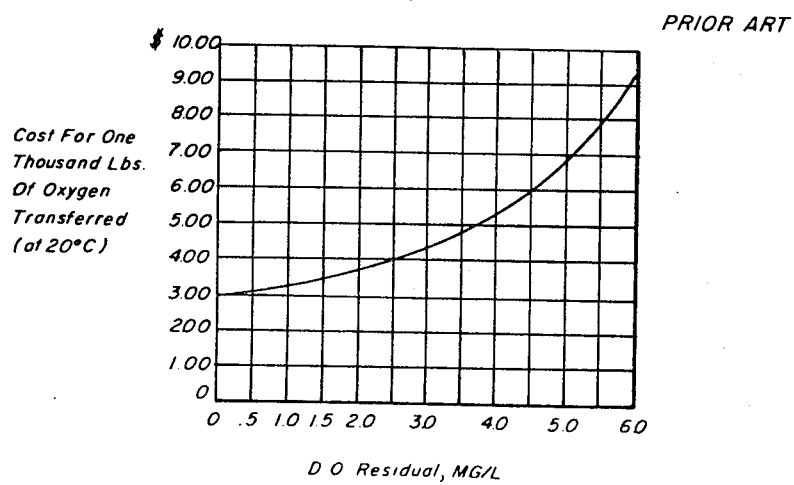
FIG. 16 is a graph illustrating the relative cost in dollars (at an unknown date) for forcing, with a floating surface aerator as seen in FIG. 3, a unit quantity of oxygen (1,000 pounds) into water containing various residual amounts of dissolved oxygen.
Figure 17:
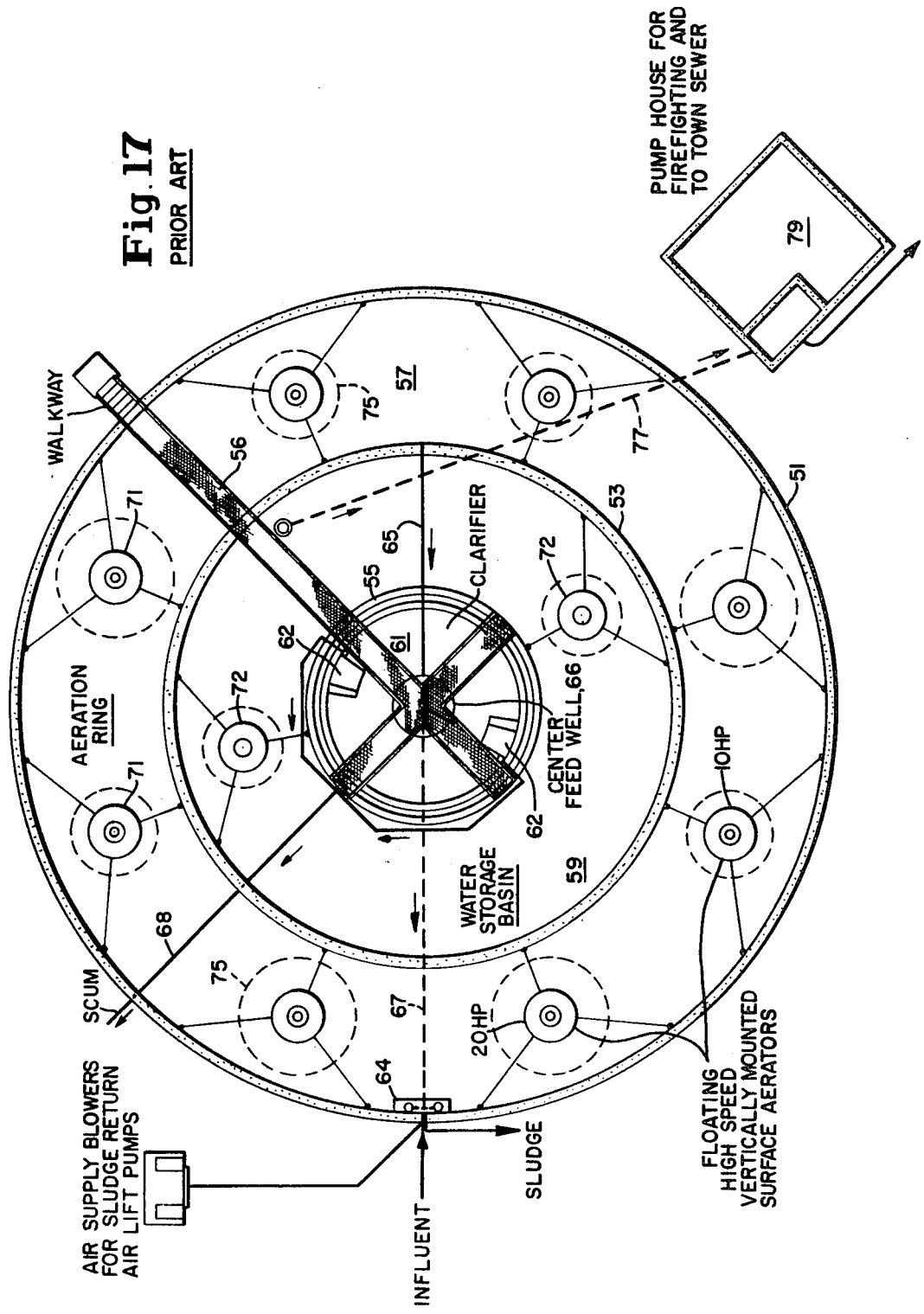
FIG. 17 is a plan view of a circular aeration basin and clarifier of the prior art in which the outer ring or annular basin is a plug flow system having eight high-speed floating, surface aerators. The central circle is a clarifier, and the middle ring is a treated water storage basin.
Figure 18:
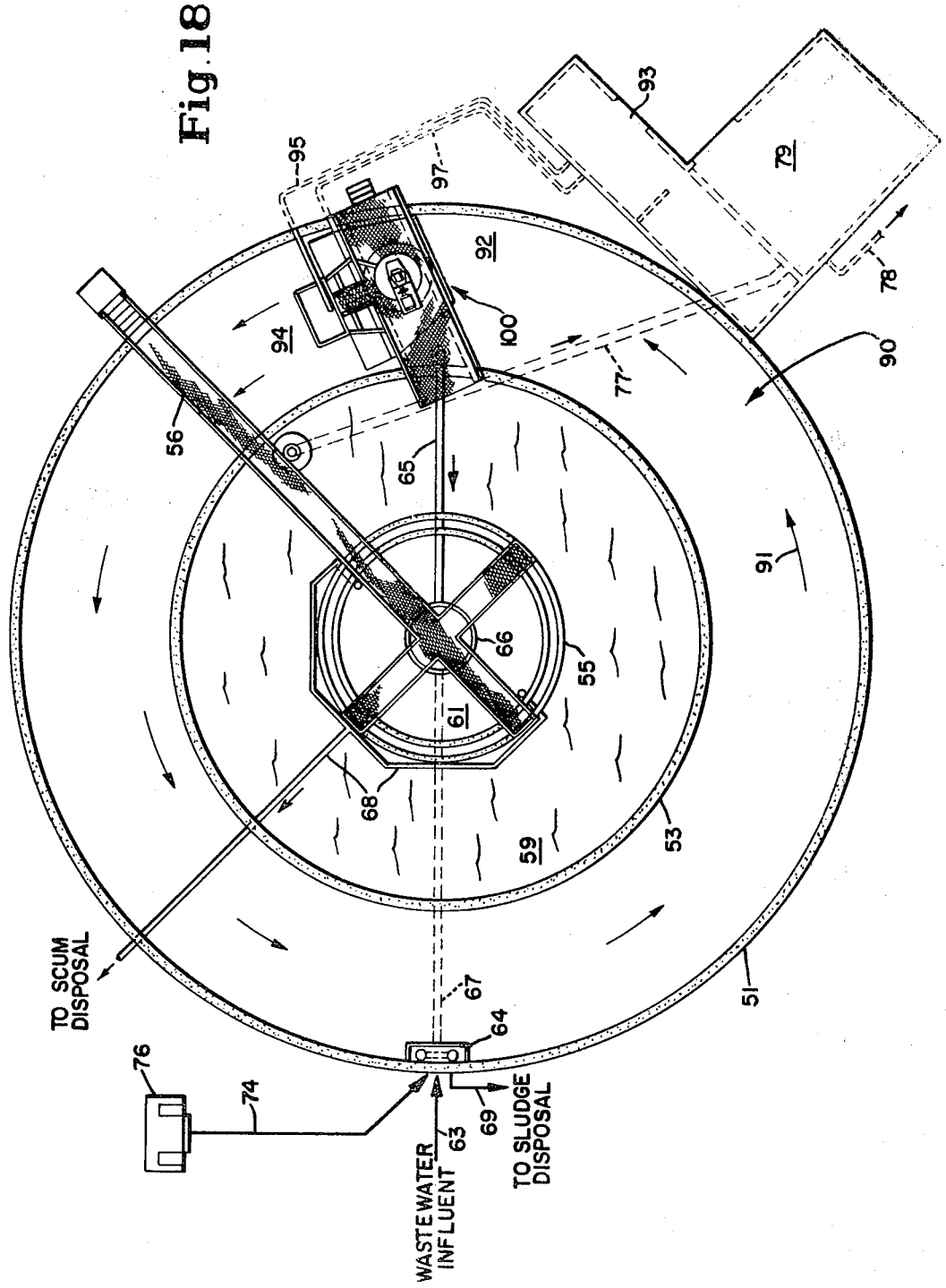

Referring to FIGS. 17 and 18, prior art system 50 comprises an outer wall 51, a middle wall 53, a clarifier wall 55, and a walkway 56. Walls 51, 53 define an annular plug-flow basin 57 which is 292.2 feet in circumference and 93.0 feet in diameter with respect to its centerline. The present liquid depth of basin 57 is 13 feet, 0 inches, and its width is 20.0 feet; it contains 556,000 gallons of liquid.

The aeration equipment used in basin 57 consists of eight high-speed floating surface aerators 71. Four of these aerators are 10-horsepower units and four are 20-horsepower units, totalling 120 horsepower. They supply a total of 225 pounds of oxygen per hour to the mixed liquor, so that a measure of their performance as transferers of oxygen to the mixed liquor can be given as 1.9 lbs $O_2$/hp-hr. The outer limit of spray for each aerator 71 is marked by circle 75.

Circular walls 53, 55 define an annular water storage basin 59 within which treated and clarified water is stored for emergency needs within the rendering plant, such as for fire fighting. Two high-speed floating surface aerators 72 maintain the water in aerobic condition, but the water is so poorly pretreated that it is often unfit for fire-fighting purposes. Line 77 connects basin 59 to pumping station 79.

Clarifier 61 is within circular clarifier wall 55 and comprises a pair of scum weirs 62 which are connected to a scum collecting and disposal line 68 and a central dispersing well 66 to which a mixed liquor line 65 from plug-flow basin 57 is connected. A sludge return line 67 is connected to the bottom of clarifier 61 and to a sludge and influent disperser 64 within basin 57. Clarified liquor flows through overflow weirs and effluent pipes (not visible in the drawings) from clarifier 61 to the clearwell or storage basin 59.

Design criteria for pretreatment of the raw rendering industry wastewater prior to its discharge into municipal sewers are:

a. Raw wastewater:
1. Average daily wastewater volume=80,000 gpd
2. $BOD_5$=variable from 2000–8000 mg/l; average=2700 mg/l
3. Ammonia Nitrogen ($NH_3$)=400–700 mg/l; average=500 mg/l
4. pH=4–12; average=6
5. Total Suspended Solids (TSS)=600–6600 mg/l; average=1200 mg/l
6. Oil and Grease (O&G)=300–1500 mg/l; average=1000 mg/l The design requirements for pretreating the rendering industry wastewater prior to its discharge into a municipal sewer are as follows:
1. $BOD_5$<200 mg/l
2. TSS<240 mg/l
3. Oil and Grease≦100 mg/l
4. $NH_3$<no limit The operating problems which beset this plug-flow aeration system 50 are as follows, in detail:

a. The aeration ring is continuously subjected to $BOD_5$, TSS, $NH_3$, pH, and waste inflow rate variations which frequently cause a shock load impact and consequent biomass upsets in the waste inflow or inlet zone of the aeration ring resulting in poor treatment plant performance.

b. The floating high-speed aerators do not provide sufficient in-depth mixing and average basin circulation velocities to adequately disperse and blend high and variable strength waste inflow with entire aeration ring contents, thus aggravating shock load problems.

c. A severe control spray problem is caused by the high-speed floating aerators.

d. The floating surface aerators create a spray cooling effect of aeration ring contents, causing a severe icing problem during the winter months and resulting in aeration basin surface freeze-over, inadequate mixing and oxygen dispersion, and poor performance of the activated sludge process due to the extremely low aeration ring mixed liquor biomass temperatures.

e. The spray effect of the surface aerators aggravates a foaming problem which is characteristic of this particular waste.

f. Significant maintenance is required on the eight floating aerators since motors and other moving parts are subjected to continuous exposure to liquid spray caused by the aerators.

g. Access to the floating aerators is difficult and the aerators are always heavily coated with sludge caused by the aerator spray, making preventive maintenance difficult.

h. Aeration ring mixing and oxygen supply cannot be separately adjusted since the high speed floating aerators must supply both mixing and aeration.

Figure 19:
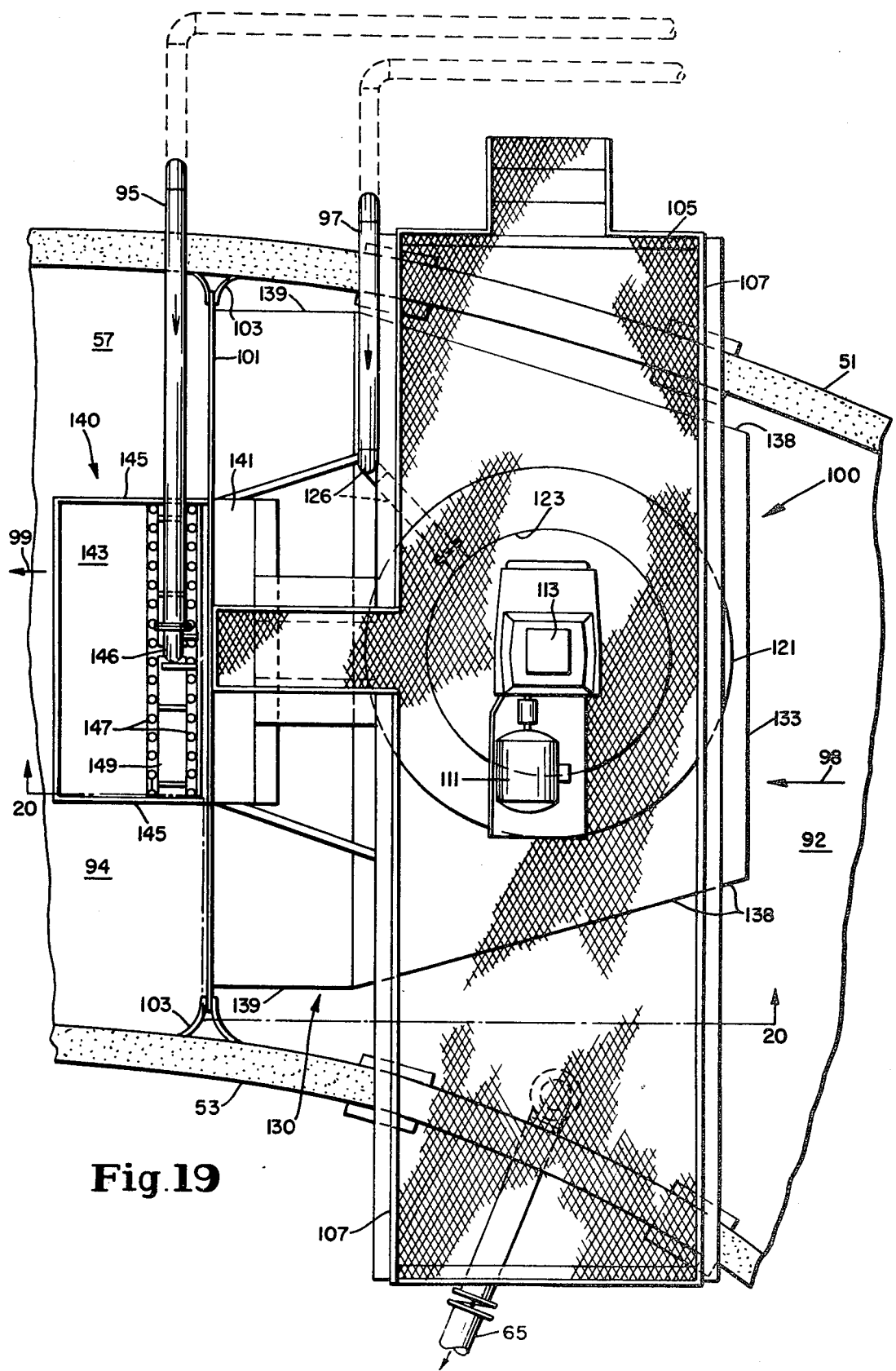
Figure 20:
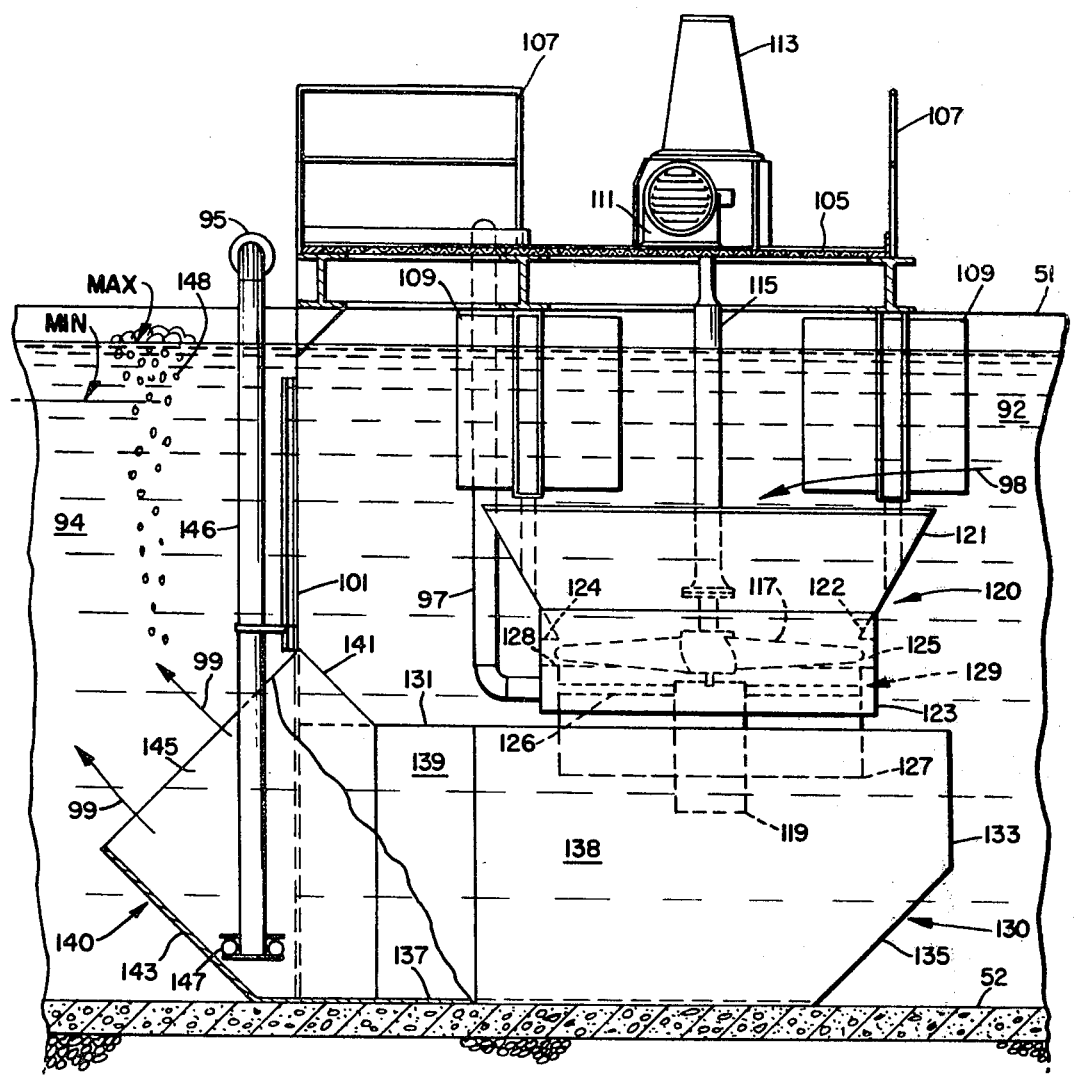

In FIGS. 18–20, plug-flow basin 57 is converted to endless channel 90 through which the mixed liquor moves translationally in circuit flow and in direction 91. Channel 90 is divided in the vicinity of unit 100 into intake channel 92 and discharge channel 94.

The treatment system, after conversion, is a complete mix, continuous-loop flow barrier oxidation ditch process. The aeration basin liquid depth is increased to 14 ft., 3 in., and its volume is increased to 609,500 gallons. The type aeration used is one 100 HP two-speed draft tube circulator/aerator (DAT), with air sparge located below the propeller and with air or oxygen supplied by one 30 HP two-speed air supply blower (1 aerator and 1 blower=130 HP total); total oxygen supply capacity=250–300 #/HR to waste.

Barriered circulator/aerator 100, seen in FIGS. 18–20, comprises a pump assembly, a mixing and aeration assembly 120, a duct 130, a diffuser section 140, a barrier 101, flexible seals 103, a walkway 105, handrails 107, and vortex baffles 109. Pump assembly comprises a motor 111 and a reduction gear 113 which are accessible from walkway 105, a vertically mounted shaft 115 which is connected to reduction gear 113, an impeller 117 which is attached to shaft 115, and a slap ring 119. The lower end of shaft 115 rotates within a recess at the top of slap ring 119.

Mixing and aeration assembly 120 comprises a downdraft tube 123, a guide tube 127, and an air sparge device 129. Impeller 117 revolves within downdraft tube 123 which is attached to an intake funnel 126.

A conical wall 122 is aligned with funnel 121 and is rigidly attached, as by welding, to the top edge of draft tube 123 and to the inner edge of an upper circular wall 124 which is attached to draft tube 123. Lower circular wall 128 is also attached to draft tube 123 and is spaced downwardly from wall 124 to define a circular space 125 therebetween within which the tips of impeller 117 revolve, as taught in U.S. Pat. No. 3,477,382. The top edge of guide tube 127 is attached to the inner edge of lower circular wall 128, and a bottom circular wall (similar to walls 124, 128 but not visible in FIG. 20) is attached to the bottom edge of draft tube 123 and to the wall of guide tube 127, thereby forming an air-tight annular ring.

Compressed air line 27 is connected to the outside of this ring, and a plurality of radially disposed sparge fingers 126 are connected at one end to the inside of this ring and at their other ends to slap ring 119 which is essentially an inverted cup. Sparge fingers 126 are provided with air release holes. Thus, after shutdown of mixing and aeration assembly 120, air from line 97 can be blown through the annular ring and through sparge fingers 126 into slap ring 119 until it escapes past the bottom edge of slap ring 119, thus clearing the entire air sparge device 129 of any sludge that may have entered.

Air sparge device 129 is supplied with compressed air by line 97 which is connected to blower house 93, adjoining pump house 79. A mixture of mixed liquor and air bubbles is created when the mixed liquor sweeps past the holes in sparge fingers 126 and is discharged downwardly into discharge duct 130 which comprises top plate 131, rear wall 133, deflector plate 135, bottom plate 137, diverging sides 138, parallel sides 139, and diffuser section 140 to which barrier 101 is rigidly attached.

Diffuser section 149 comprises upper plate 141, lower plate 143, sides 145, and a T-shaped diffuser assembly comprising downcomer 146 which is connected to air supply line 95 from blower house 93, a stabilizer bar 149 which is disposed transversely to the flow of liquor and close to bottom plate 137, and a double row of diffusers 147 which are flow connected to downcomer 146. Suitable diffusers are manufactured and sold as Model 750-T-10 by Enviroquip Corporation. Intake flow 98 enters funnel 121, passes sparge device 129 and becomes an aerated mixture, is deflected toward diffuser section 140 by deflector plate 135, selectively receives additional air from air diffuser assembly 147, and leaves as aerated flow 99 while bubbles 148 escape to the surface.

Design criteria for pretreatment of rendering industry wastewater in endless channel 90 and subsurface unit 100 and prior to discharge into municipal sewers are:

a. Raw wastewater (identical to conditions before conversion)
b. Pretreatment requirements, to allow treated wastewater from annular water storage basin 59 to be reused in certain rendering plant operations:
  1. $BOD_5 < 30$ mg/l
  2. $TSS < 30$ mg/l
  3. Oil and Grease $\leq 20$ mg/l
  4. $NH_3 < 30$ mg/l Existing problems which are solved by conversion to a barrier oxidation ditch are as follows:

a. The existing eight high-speed floating surface aerators are replaced by one draft tube circulator/aerator which provides a translational flow velocity of 1.0 feet per second, resulting in uniform solids suspension throughout endless channel 90.
b. The entire loop flow passes through the draft tube circulator/aerator once per cycle (every 4 minutes, 30 seconds) for homogeneous subsurface aeration and mixing, resulting in complete mixing of raw inflow waste with aeration ring contents, thereby avoiding pre-existing problems of shock loading, inadequate in-depth mixing, and poor oxygen dispersion.
c. The existing aerosol spray problem is eliminated.
d. Icing conditions and ice build-up problems within the endless channel are eliminated because homogeneous subsurface aeration in the draft tube circular/aerator adds heat rather than causing a heat loss in the mixed liquor within the endless channel 90.

EXAMPLES II–VI

The following examples II–VI present convenient and low cost methods for conversion of conventional complete-mix aeration basins, using surface aeration, to barrier oxidation ditch systems, using surface or subsurface aeration, as seen in FIGS. 21–30. This type of conversion is desirable when an existing activated sludge treatment plane must be upgraded to provide nitrification and possibly denitrification on a year-around basis. By conversion to the barrier oxidation ditch system, subsurface aeration by draft-tube circulator/aerators in a barriered assembly or in an adjustably apertured barriered assembly can be utilized to maintain mixed liquor temperatures as high as possible during the winter season as compared to the existing surface aeration system which causes temperature loss by a spray cooling effect.

Moreover, the barrier oxidation ditch is capable of providing point-source aeration because the barrier can support the necessary hydraulic head for propelling mixed liquor through any reasonable length of channel. In consequence, desired lengths of the nitrification and denitrification zones can be maintained without interference from additional aerators, as in prior art oxidation ditches.

In addition, the barrier oxidation ditch system can be designed to provide translation velocities over 1.0 fps in order to maintain mixed liquor solids concentrations over 5000 mg/l in suspension. This higher mixed liquor suspended solids (MLSS) or biomass concentration is normally required to maintain a sufficiently long sludge age for growth and maintenance of nitrifying and denitrifying biomass organisms.

The draft-tube circulator/aerator and accompanying air supply blower can also be separately controlled so that oxidation-ditch velocity and oxygen transfer rate can be independently adjusted to optimize the lengths and volumes of the aerobic and anoxic zones in the oxidation ditch, resulting in maximum nitrogen removal by biological nitrification—denitrification.

Such conversion also produces another beneficial effect that is inherent in any barriered system, whether aeration is subsurface or surface. It is the energy economy that take place when back-mixing of aerated liquor (occuring as a contact of mixed liquor with an oxygen-containing gas) to the aerator intake is completely prevented and when heterogeneous aeration (defined as blending of aerated liquor with non-aerated liquor to produce a desired average D.O. content) is replaced with homogeneous aeration (defined as uniformly aerating all of the liquor to the desired D.O. content).

EXAMPLE II

Figure 21:
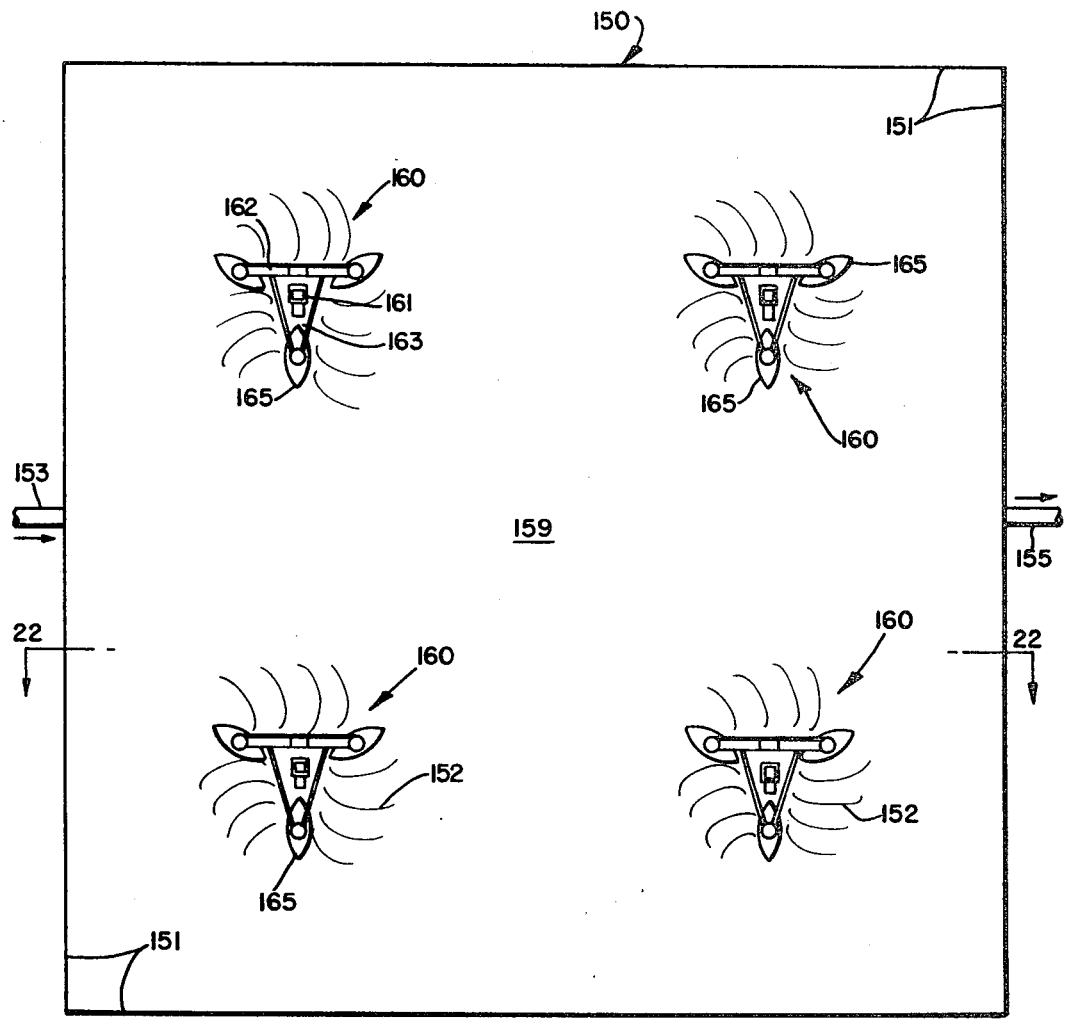
FIG. 21 is a plan view of a square complete mix aeration basin of the prior art in which four floating, low-speed surface aerators provide dissolved oxygen to the wastewater.
Figure 22:
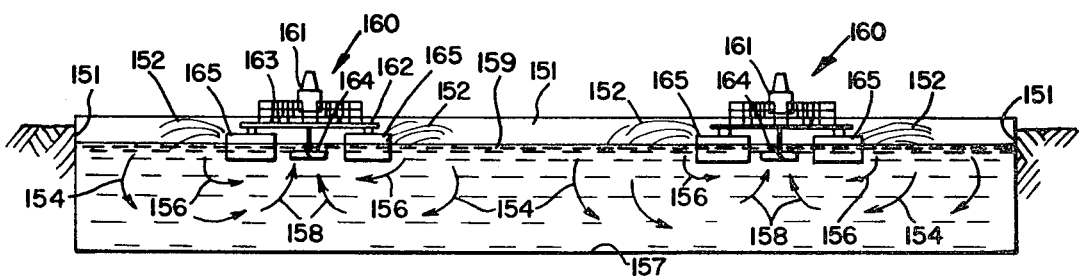
FIG. 22 is a sectional elevation of the same complete mix basin, looking in the direction of the arrows crossing the line 22—22 in FIG. 21.

An industrial wastewater is being aerobically treated with the activated sludge process in an square complete-mix basin 150 as shown in FIGS. 21 and 22, using four floating low-speed surface aerators 160. (As is known in the art, an equal number of fixed surface aerators of the same size could be used with equal effectiveness.) Basin 150 has sides 151, a bottom 157, an influent line 153, and an effluent line 155. Each aerator 160 comprises a motor and reduction gear 161, a main support beam 162, a triangular platform 163, an impeller 164, and three floats 165.

Heterogeneous aeration and back-mixing occur in basin 150 because spray 152 is thrown out by each aerator 160 onto surface 159 of the mixed liquor. Some of the spray 152 is thrown a considerable distance and creates and becomes part of relatively slower moving eddies 154 which reach the outer limits of the outreach for the aerator, become blended with the mass of mixed liquor, and sink to bottom 157 before returning to the aerator as intake 158 which possesses a dissolved-oxygen content that is slightly below the average D.O. of the basin. This situation is termed heterogeneous aeration plus mild back-mixing.

Other portions of spray 152 land on surface 159 within short distances of floats 165 and promptly are pulled into eddies 156 which possess a high D.O. content and which almost immediately become part of intakes 158 to impellers 164. This situation is termed heterogeneous aeration plus intense back-mixing. Basin 150 contains innumerable variations and combinations of these situations, but all represent some degree of energy wastage as compared to homogeneous aeration without back-mixing.

Basin 150 is characterized by the following design criteria:
a. Average daily sewage flow = 1 MGD.
b. Raw waste $BOD_5$ = 300 mg/l.
c. $BOD_5$ loading = 2500#/day at 300 mg/l $BOD_5$.
d. Ammonia loading at 60 mg/l $NH_3$ = 500 pounds/day.

Basin 150 has the following equipment and geometrical properties:
a. Liquid depth = 12.0 feet.
b. Volume = 1 million gallons.
c. Length × width = 105.5 feet × 105.5 feet.
d. Aeration provided by four 20-HP low-speed floating surface aerators.

Basin 150 has the following process characteristics:
Process Design
a. Existing basin is designed for extended aeration by activated sludge treatment with Food/Biomass Ratio = 0.20; MLSS (mixed liquor suspended solids concentration) = 2,500 mg/l.
b. 1.5# oxygen to be supplied to waste per pound of $BOD_5$ applied per day; total oxygen transfer requirement = 160#/HR to waste.
c. No ammonia removal (nitrification) requirements and no nitrate removal (denitrification) requirements.
d. Minimum mixed liquor temperature = 4° C. (caused by surface aerator spray cooling effect).

Figure 23:
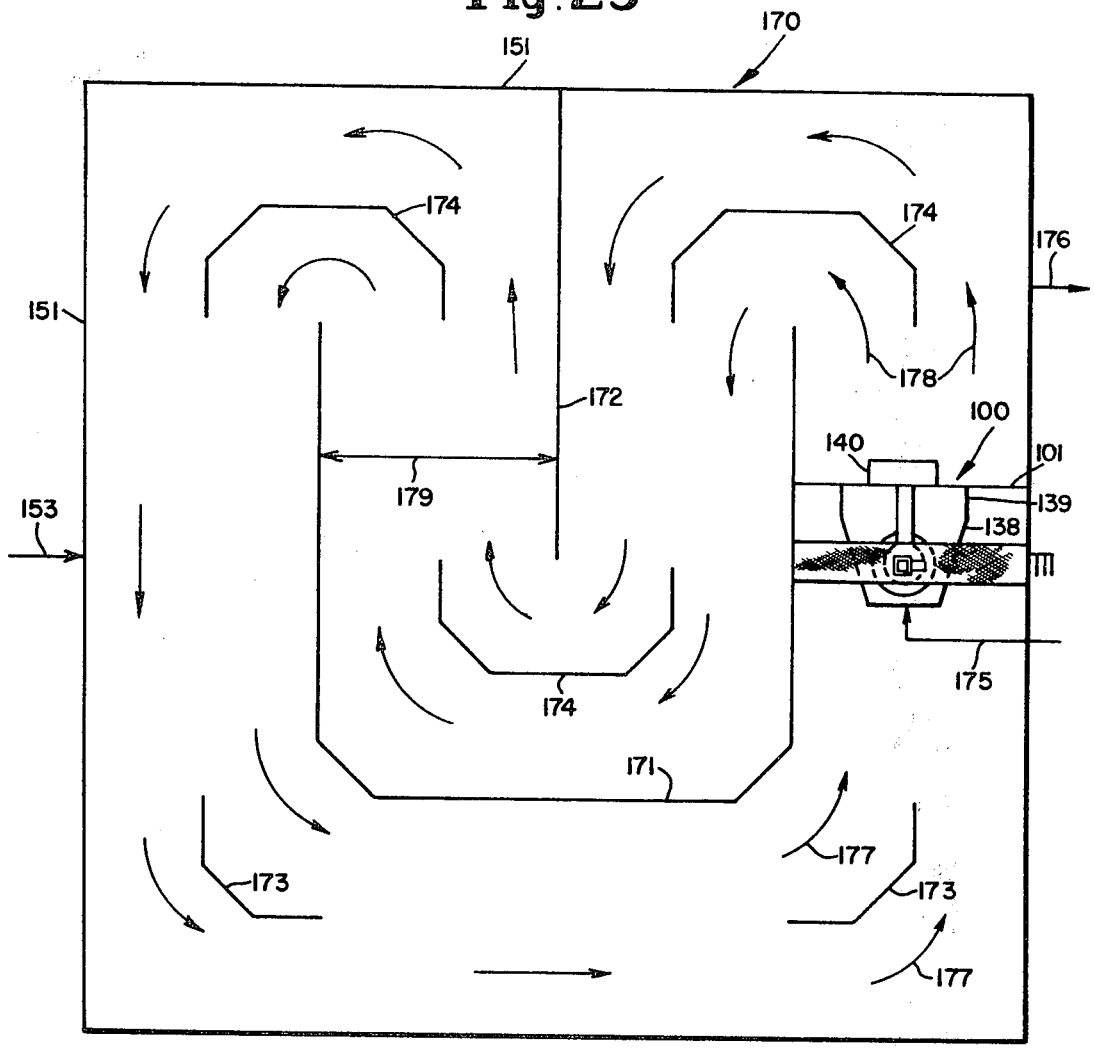

Basin 150 is then converted to barrier oxidation ditch 170, as shown in FIG. 23, by carefully dropping onto bottom 157 a number of straight walls or partitions having considerable mass and means for partial self-support on the bottom. They have sufficient width to extend above the liquid surface, i.e., more than 12 feet. With one exception, these walls are conjoined to form five partition members: a large U-shaped channel wall 171, three small U-shaped turning baffles 174, and two small L-shaped baffles 173. All members 171, 174, 173 stand on floor 157 without contact with sides 151. The exception is central channel wall 172 which is attached to a wall 151, centered within U-shaped channel wall 171 and between two of the U-shaped turning baffles 174. These members 171, 172, 173, 174 form an endless channel having a uniform width 179 which is equal to one fourth the length of a side 151 and a total length that is approximately four times the length of a side 151.

A circulator/aerator 100 is then dropped into this endless channel within almost any straight portion thereof so that it completely blocks flow through the channel with barrier 101 and its sealing strip 103 equalling width 179. The mixed liquor then flows counterclockwise, as shown in FIG. 23, entering the intake channel, which is immediately upstream of circulator/aerator 100, as anoxic flow 177 and leaving the discharge channel, which is immediately downstream of circulator/aerator 100, as aerated flow 178. Effluent line 176 is downstream of circulator/aerator 100.

After such conversion of basin 150 to barrier oxidation ditch 170, the basin design criteria are unchanged as to average daily flow, BOD loading, and ammonia loading. The geometrical characteristics are unchanged as to liquid depth and volume and in other respects are as follows:
a. Channel cross-sectional area = 316.5 sq. ft.
b. Channel length = 422 ft.
c. Aeration is provided by one 100-HP, two-speed, special draft tube circulator/aerator in combination with one 30-HP, two-speed, air supply blower.

Ditch 170 has the following characteristics:
a. Basin MLSS (biomass level) is increased to 5000 mg/l in order to provide for sufficient sludge age for growth and maintenance of nitrifying-denitrifying biomass organisms.
b. Food/Biomass ratio = 0.10; MLSS = 5000 mg/l.
c. 1.5# oxygen to be supplied per #$BOD_5$+4.6# oxygen to be supplied per #$NH_3$ applied per day; total oxygen transfer requirement = 260#/HR to waste.
d. Nitrification-denitrification required to produce final effluent $NH_3$ concentration that is no more than 4 mg/l and $NO_3$ concentration that is no more than 5 mg/l.
e. Channel translational circulation velocity = 1.03 fps.
f. Circuit time = 6.83 minutes.
g. Draft tube circulator pumping rate = 325 cubic feet per second (cfs).
h. Oxidation ditch oxygen supply is controlled to produce one aerobic and one anoxic zone in the ditch channel.
i. Minimum mixed liquor temperature allowed = 10° C. (as maintained by subsurface aeration).

Existing problems which are solved by conversion to a barrier oxidation ditch are as follows:
a. The existing four low-speed floating surface aerators are replaced by one draft tube circulator/aerator which provides a translational flow velocity of 1.03 feet per second, resulting in uniform mixing and homogeneous subsurface aeration as the entire loop flow.

b. The entire loop flow passes through the circulator/aerator once per cycle (every 6 minutes, 50 seconds), resulting in complete mixing of raw inflow waste with aeration ring contents of the channel, homogeneous subsurface aeration, and no back-mixing and thereby avoiding pre-existing problems of energy wastage.

EXAMPLE III

A municipal wastewater is being aerobically treated with the activated sludge process in a square complete-mix basin having the identical geometrical characteristics and equipment as basin 150 of Example II and as seen in FIGS. 21 and 22, except that the floating low-speed surface aerators are 15 HP instead of 20 HP. The basin is heterogeneously aerated with typical back-mixing occurring, so that there is constant energy wastage.

The basin has the following design criteria:
a. Average daily sewage flow = 1 MGD.
b. Raw waste $BOD_5$ = 215 mg/l.
c. $BOD_5$ loading = 1,800#/day.

The basin has the following process characteristics:
a. Existing basin is designed for extended aeration and activated sludge treatment with Food/Biomass Ratio = 0.10; MLSS (mixed liquor suspended solids concentration) = 2500 mg/l.
b. 1.5# oxygen to be supplied to waste per pound of $BOD_5$ applied per day; total oxygen transfer requirement = 112.5#/HR to waste.

Figure 24:
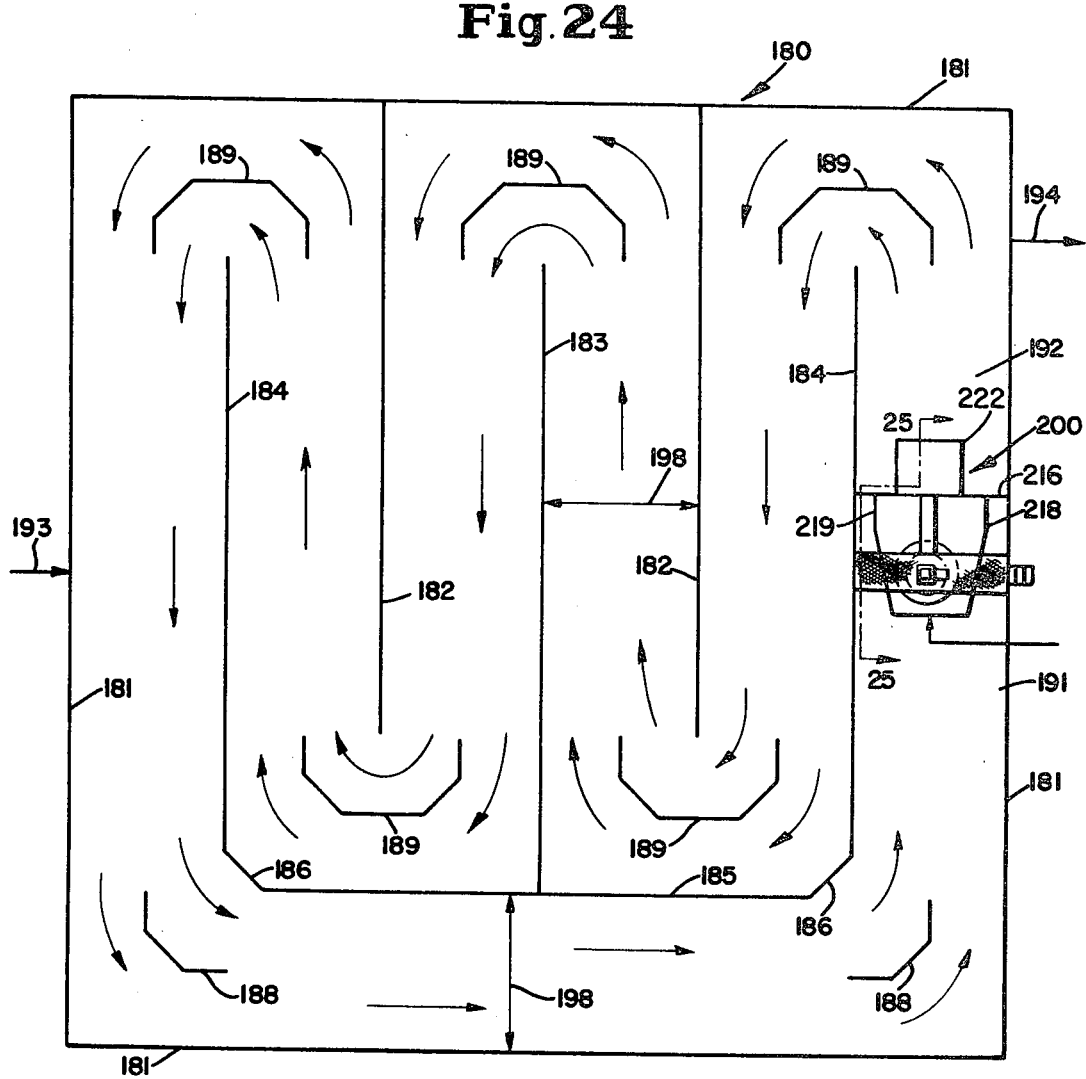

The square basin is converted to barrier oxidation ditch 180, as seen in FIG. 24, by dropping onto its bottom 157 a number of straight walls or partitions to form an endless channel having a width 198 equalling one sixth of the length of a side 181. The partitions consist of two side-attached walls 182, a central wall 183 having the same length as walls 182, two outer walls 184 which are slightly shorter than walls 182, a transverse wall 185 which is shorter than walls 184, and two very short walls 186. Walls 184, 185, 186 are conjoined to form an E-shaped partition which is inserted between walls 182. Five U-shaped turning baffles 189 are placed beyond each unattached end of a wall 182, 183, 184, and two turning baffles 188 are lowered into the endless channel at the corners near walls 186. Then a circulator/aerator 200 is lowered into the endless channel at any convenient location, such as a straight portion between an outside wall 181 and an outer wall 184, as seen in FIG. 24.

Figure 25:
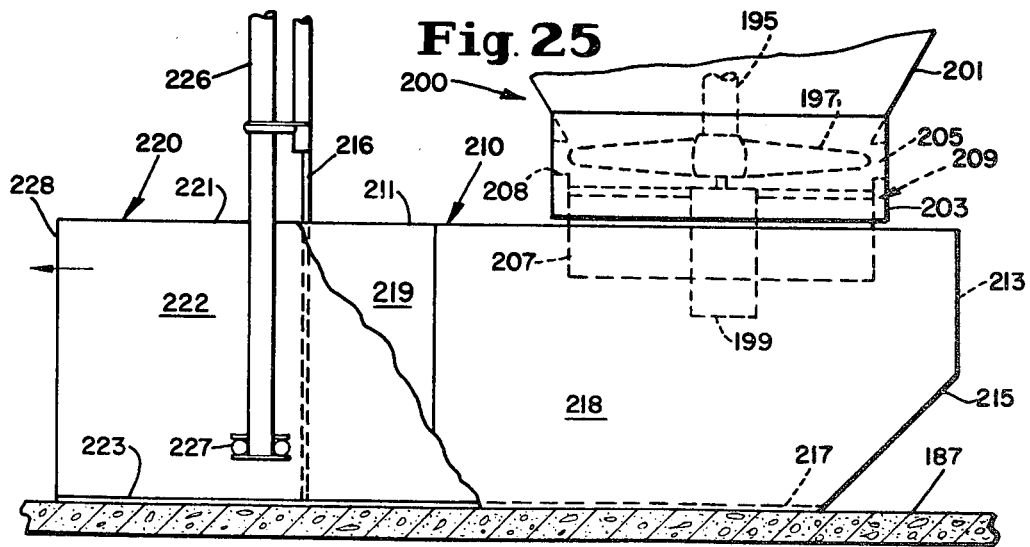

Circulator/aerator 200 is shown in side elevation, with a portion broken away, in FIG. 25. Circulator/aerator 200 is similar to circulator/aerator 100 except as to its discharge arrangement. Circulator/aerator 200 comprises a vertically mounted shaft 195 which is powered by a motor and reduction gear, an impeller 197 attached to shaft 195, and a slap ring 199 within which the lower end of shaft 195 rotates. Impeller 197 rotates within circular space 205 along the sides of downdraft tube 203 which is attached to intake funnel 201.

Air sparge device 209 comprises an annular ring (formed by downdraft tube 203, guide tube 207 and a pair of horizontally disposed circular walls) and a plurality of perforated sparge fingers which are radially disposed and connected both to the annular ring and to slap ring 119. Diffused air from sparge device 209 is entrained by the downflowing liquor to form a liquor-air mixture which is forced downwardly into discharge duct 210, wherein it is deflected in the downstream direction by deflector plate 215 and bottom plate 217.

Duct 210 additionally comprises rear plate 213, top plate 211, diverging sides 218, parallel sides 219, and diffuser section 220. Barrier 216, having thick rubber seals at its side and bottom edges, forms a downstream side of duct 210, with an opening into diffuser section 220 which comprises parallel sides 222, top 221, bottom 223, and open end 228. A diffuser assembly 227 is removably inserted through an opening in top 221 and is supplied with air from air supply line 226.

The aerated discharge from diffuser section 220 moves horizontally into discharge channel 192 instead of boiling upwardly as it does from diffuser section 140 and is thus preferred for conversion of relatively shallow basins wherein vertical blending is not a problem.

After conversion to barrier oxidation ditch 180, the liquid depth, volume, and basin design criteria are unchanged. The geometrical and equipment characteristics of ditch 180 are as follows:
a. Channel cross-sectional area = 211 square feet.
b. Channel length = 632 square feet.
c. Aeration is provided by one 50-HP, two-speed, draft tube circulator/aerator in combination with one 20-HP, two-speed, air supply blower.

The process design characteristics of ditch 180 are as follows:
a. Basin MLSS (biomass level) is increased to 5,000 mg/l in order to provide for sufficient sludge age for growth and maintenance of nitrifying-denitrifying biomass organisms.
b. Food/Biomass ratio = 0.05 at MLSS = 5,000 mg/l.
c. 1.5# oxygen to be supplied per #$BOD_5$+4.6# oxygen to be supplied per #$NH_3$ applied per day; total oxygen transfer requirement = 160#/HR to waste.
d. Nitrification-denitrification are required to produce final effluent concentration of $NH_3$ that is no more than 4 mg/l and a final effluent concentration of $NO_3^-$ that is no more than 5 mg/l.
e. Channel translational circulation velocity = 1.17 fps.
f. Circuit time = 9.0 minutes.
g. Draft tube circulator pumping rate = 248 cubic feet per second (cfs).
h. Oxidation ditch oxygen supply is controlled to produce one aerobic and one anoxic zone in the ditch channel.
i. Minimum mixed liquor temperature allowed = 10° C. (as maintained by subsurface aeration).

EXAMPLE IV

FIG. 26 shows a typical complete mix aeration basin of the prior art, having a rectangular shape, which has been converted to a barrier oxidation ditch 230 with an internal clarifier 240, without relocating or otherwise changing one of its aerators, by adding vertically disposed partitions and a horizontally disposed barrier, which is not visible in FIG. 26, and by excavating a portion of the bottom of the basin near the remaining aerator.

The partitions comprise clarifier walls 241 having an intake opening for intake flow 243, a discharge opening for clarified discharge flow 245, and a sludge discharge opening for sludge flow 247. An additional partition is vertical barrier 232. It is attached along its lower edge to horizontal barrier 236, as shown in FIG. 29. In combination, they form a "stepped barrier".

The body 257 of mixed liquor above horizontal barrier 236 surrounds pump/aerator 270 and is the terminus of the intake channel in FIG. 27 and the beginning of the discharge channel in FIGS. 28 and 29. The body 256 of mixed liquor beneath horizontal barrier 236 is the beginning of the discharge channel in FIG. 27 and the terminus of the intake channel in FIGS. 28 and 29. Body 257 is bounded by the nearby transversely disposed partition 242, vertical barrier 232, transverse partition 235, horizontally disposed barrier 236, and a submerged junction 255 of the bottom 251 of the former basin with horizontal barrier 236 and with the slope leading to bottom 253 of the intake channel.

As shown in FIGS. 26–29, body 256 has a bottom 253 which is bounded at one end by partition 238 and at the other end by junction 254 of the slope leading to junction 255. Bottom 253 also has sides 259 which are junctions of the slopes on either side.

An approach zone to body 256 (which may or may not be excavated to a greater depth exemplarily begins at 252 if horizontal barrier 236 is approximately at the depth of the bottom 251 of the former basin and body 256 is in an excavation therebeneath, as seen in FIG. 26. Alternatively, if the horizontal barrier is substantially elevated above the bottom of the channel, there is no need for a deepened approach zone, so that bottom 252 does not exist, and junction 255 is a submerged vertical partition which rests at its bottom edge on bottom 251 of the former basin and which defines the end of intake channel 256.

A pair of outer longitudinal partitions 238, having a length nearly as great as the length of the former basin, are parallel to and spaced from the longer sides 231 of the former basin. They form short channels with the longer sides 241 of the clarifier and also form a pair of long outer channels with basin sides 231. A pair of end partitions 239, spaced inwardly from outer partitions 238 and on either side of a central return partition 237, as is generally known in the art, are disposed at the end of the former basin which is opposite to the clarifier. All partitions 235, 237, 238, 239 are connected to each other and/or to sides 231, 233 and walls 241 with curved baffles 234, as is known in the art.

Incoming wastewater, such as industrial food-process wastewater or municipal sewage, selectively enters the basin as influent 261. The liquid in the channels makes seven circular flows 263 around the ends of the partitions 238, 239, 237 while passing through the succession of straight channels. The liquid can be aerated but once during each pass through the draft tube of circulator/aerator 270.

Downdraft circulator/aerator 271, as one embodiment of circulator/aerator 270, is shown in FIG. 27, taken as a sectional elevation through its downdraft tube 281, looking in the direction of the arrows crossing the line 27—27 in FIG. 26. Tube 281 is sealably connected at its lower end to horizontal barrier 236. An impeller 284 is attached to a shaft 282 which is connected to a motor 283. Impeller 284 revolves within tube 281 above a sparge device 286. Air is fed to sparge device 284 through supply line 285. A liquor/air mixture moves downwardly as flow 287. With this embodiment of circulator/aerator 270, however, flows 263 and the intake and outlet flows are in reverse of the direction shown in FIG. 26.

Updraft circulator/aerator 273, as another embodiment of circulator/aerator 270, is shown in side elevation in FIG. 28, looking in the direction of the arrows crossing the line 28—28 in FIG. 26. Circulator/aerator 273 comprises a motor 291, a shaft 292, a mechanical surface aerator 293, and an updraft tube 294. Intake liquor flows upwardly through body 256, through updraft tube 294, and, as a spray 295, splashes over the surface of body 257. As indicated in FIG. 26, it then begins to move counterclockwise around the clarifier as the flow labelled "OUTLET".

Updraft circulator/aerator 275, as a third embodiment of circulator/aerator 270, is shown in side elevation in FIG. 29, looking in the direction of the arrows crossing the line 29—29 in FIG. 26. Circulator/aerator 275 comprises a motor 301, an elongated shaft 302 attached to motor 301, an impeller 303 attached to shaft 302, an air sparge device 304 disposed immediately below impeller 303, an air supply line 305 which is connected to device 304, and an elongated draft tube 306 within which impeller 304 rotates. Flow 307, corresponding to "INTAKE" in FIG. 26, moves into body 256 beneath barrier 236 and enters the mouth of tube 306 as flow 308. After becoming a mixture of liquor and air, it then is thrown out of tube 306 as spray 309 onto the surface of body 257. Differential head 258 is created between the surface levels of the intake channel and the discharge body.

Although any embodiment 271, 273, 275 of circulator/aerator 270 may be an existing aeration device that is installed and operating in the original complete mix basin, a much more powerful device is generally needed for circulating the entire contents of the basin when it is divided by partitions 235, 237, 238, 239, 241, 242 to form an endless channel, as seen in FIG. 26 and when a single circulator/aerator 270 is used. However, it is possible to move the existing devices into side-by-side alignment and utilize at least three of them, if desired, by placing clarifier 240 partially or entirely outside of the sides 231, 233 of the old basin, so that they pump and aerate in parallel. Such an arrangement is illustrated in FIG. 30 for Example V.

Circulator/aerators 271, 273, 275 are conveniently installed as units with horizontal barrier 236 and vertical barrier 232 or with barriers 232 and 236 attached to partitions 242 and 235. Such units can be lowered into position with a crane. If existing devices are being utilized, each sequentially assembled and powered unit can be connected quickly to electrical and air supply lines before an unduly large proportion of the aerobic microorganisms of the old basin have expired from lack of oxygen.

EXAMPLE V

Figure 30:
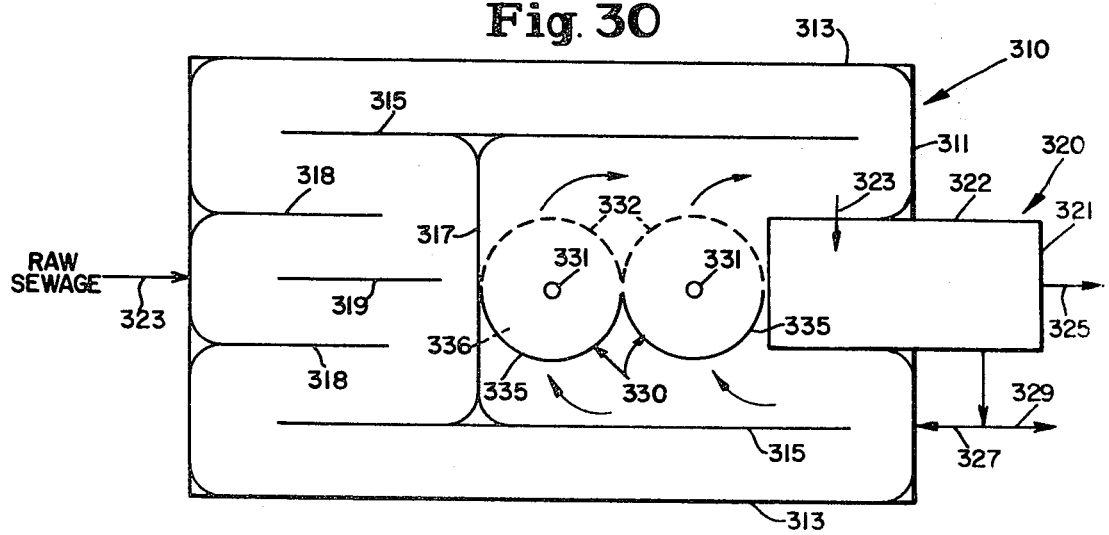

A barrier oxidation ditch 310, having almost exactly the configuration of ditch 230 seen in FIG. 26, is shown in FIG. 30, having been formed from an existing complete mix basin. Ditch 310 comprises sides 311, 313, partitions 315, 317, 318, and 319, clarifier 320, and circulator/aerators 330. Clarifier 320 comprises sides 321 and 322. Inflow 323 of aerated mixed liquor enters near one end, and outflow 325 of clarified liquor leaves at the other end. Sludge is discharged from a collecting device and in part is removed from the system as discharge sludge 329 and in part is returned to the endless channel as return sludge 327.

The pair of circulator/aerators 330 are classified as "dual-baffle" devices in Ser. No. 28,383, filed Apr. 9, 1979, now U.S. Pat. No. 4,278,547. Another apt descriptive term is "stepped barrier".

Each circulator/aerator 320 comprises a vertical intake barrier 332, a vertical discharge barrier 335, a horizontal barrier 336 to which both barriers 332, 335 are attached and which is disposed between them, and a vertically mounted mechanical aerator 331 which may be updraft aerators 273 and 275 of FIGS. 28 and 29. A submerged turbine that provides aeration can also be utilized as circulator/aerator 331. If surface circulator/aerator 271 is utilized, it can be floatingly supported. The concave surface of intake barrier 332 faces upstream, and the concave surface of discharge barrier 335 faces downstream. Horizontal barrier 336 is preferably disposed at about mid-depth in the channel.

By reversing the nomenclature of barriers 332, 335, so that intake barrier 332 is on top of horizontal barrier 336 and discharge barrier 335 is beneath barrier 336, downdraft circulator/aerator 271 of FIG. 27 can be utilized as circulator/aerator 331. Barriers 332, 335 can be, for example, parabolic, triangular, pentagonal, or semi-circular in shape, but semi-circular barriers 332, 335 and circular horizontal barriers 336 are preferred.

Because there is little need in a stepped-barrier assembly for the intake channel to be of a significantly greater cross section than the draft tube of the circulator/aerator, it is highly preferred to dispose updraft and downdraft circulator/aerators alternately, so that both intake barriers 332 and discharge barriers 335 are alternately above and beneath horizontal barriers 336; however, intake barriers 332 can be much smaller than discharge barriers 335 so that the horizontal barrier is preferably overlapped by the alternate discharge barriers and is not circular in shape but is elongated with undulating sides.

Circulator/aerators 271, 273, 275 can be readily combined with vertical and horizontal barriers into stepped barrier assemblies which are suitable for lowering into the endless channels of circulator plug flow basins or into endless channels formed by lowering partitions into rectangular plug flow basins. The floors of the basins can be excavated so that the lower vertical barrier is the end of the excavation, but it is preferred to utilize a stepped-barrier assembly that can be prefabricated and lowered into the floor of the basin.

Such stepped-barrier assemblies can comprise straight barriers 236, 242, or curved barriers 335, 332 or barriers having any desired intermediate shape. Thick, bendable strips or foamed elastomeric pads having waterproof skins should be attached to their side and bottom edges as seals where contact with sides, partitions, or bottoms of the old plug flow system is to be expected.

EXAMPLE VI

Figure 31:
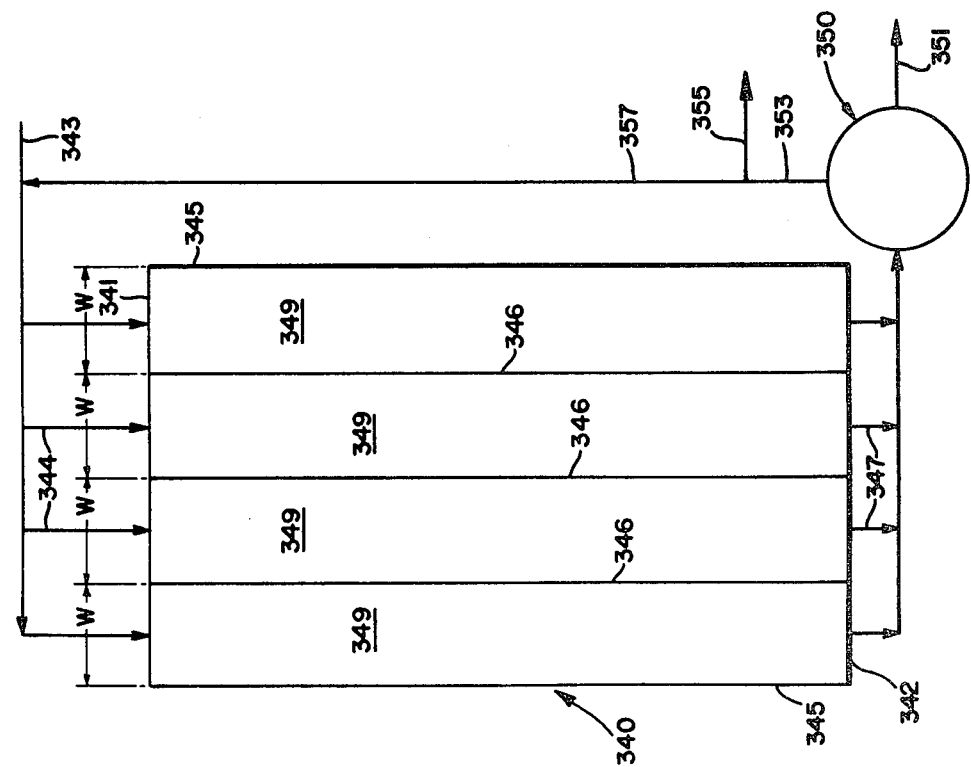
FIG. 31 is a plan view of a conventional activated sludge plant of plug flow configuration which is divided into four parallel tanks, each receiving equal amounts of wastewater influent.

FIG. 31 shows a conventional activated sludge plant 340 having a plug flow configuration in four contiguous rectangular tanks, each treating one-fourth of the total wastewater influent. The length of each tank is seven times its width. The wastewater is mixed with the return sludge before being fed to the four tanks. Typically, volumetric loading is about 25 lbs. BOD/day/1,000 cubic foot, and the food-to-microorganism ratio (organic loading) is approximately 0.20 lb. BOD/day/lb. MLSS. Aeration detention time is about 8 hours and sludge retention time is about 8 days. The mixed liquor has a MLSS concentration of about 2,200 mg/l Air is supplied to transfer about 1.0 lb. of $O_2$ per lb. of BOD applied. The influent waste contains about 150 mg/l at BOD. Organic food for the microorganisms is changed into biomass or sludge as the mixed liquor flows by gravity toward the discharge end of each tank. Disposal of excess sludge 355 is a serious problem. The secondary effluent 343 contains about 15 mg/l BOD, so that removal efficiency is about 90 percent.

Plant 340 has a feed end 341, a discharge end 342, and elongated sides 345. It is divided into four parallel, contiguous tanks 349 by three partitions 346. Sides 345 have a length that is seven times the width of each tank 349. Influent 343, dividing into four equal parts, enters the feed ends of the four tanks 349 and progresses by gravity flow toward their discharge ends. Compressed air is fed along the lengths of tanks 349 through diffusers (not shown in the drawings). At the discharge ends of tanks 349, the entire amount of mixed liquor leaves as effluent through lines 347 and is fed to clarifier 350 from which clarified liquor 351 is sent to tertiary treatment. Sludge is drawn off as underflow 353 and is divided into wasted sludge 355 and return sludge 357 which is mixed with influent 343. Clarified liquor 351 plus wasted sludge 355 approximately equal the volume of influent 343.

The four plug flow basins of plant 340 are converted into four parallel barrier oxidation ditch basins by: (A) lowering a planar dividing wall 368 into each tank 349 and disposing it exactly in the middle thereof, so that an endless channel 369, having half the width of a tank 349, is formed in each tank 349; and (B) lowering a circulator/aerator 100 into this channel, thereby dividing it, in the vicinity of the circulator/aerator, into an intake channel which receives the mixed liquor-containing influent 343 and a discharge channel containing aerated liquor which moves toward discharge end 342 where a small portion 362 of the circulating mixed liquor is discharged to clarifier 350. Clarifier 350 quite easily handles the load, discharging clarified flow 363 and sludge 364 which separates into wasted sludge 365 and return sludge 366. The circulating mixed liquor is able to build up to 5,000 mg/l of MLSS because the relatively high velocity in translational flow of the mixed liquor can maintain the solids in suspension.

Conventional plant 340 of plug flow configuration thus becomes upgraded plant 360 of complete mix configuration in four barrier oxidation ditches operating in parallel. Barrier 101 of each circulator/aerator 100 is sealably connected to a side 345 and/or to a partition 346 and/or to a wall 368 and to the bottom of the old basin. Air supply lines to the four circulator/aerators 100 are not shown in FIG. 32.

Figure 32:
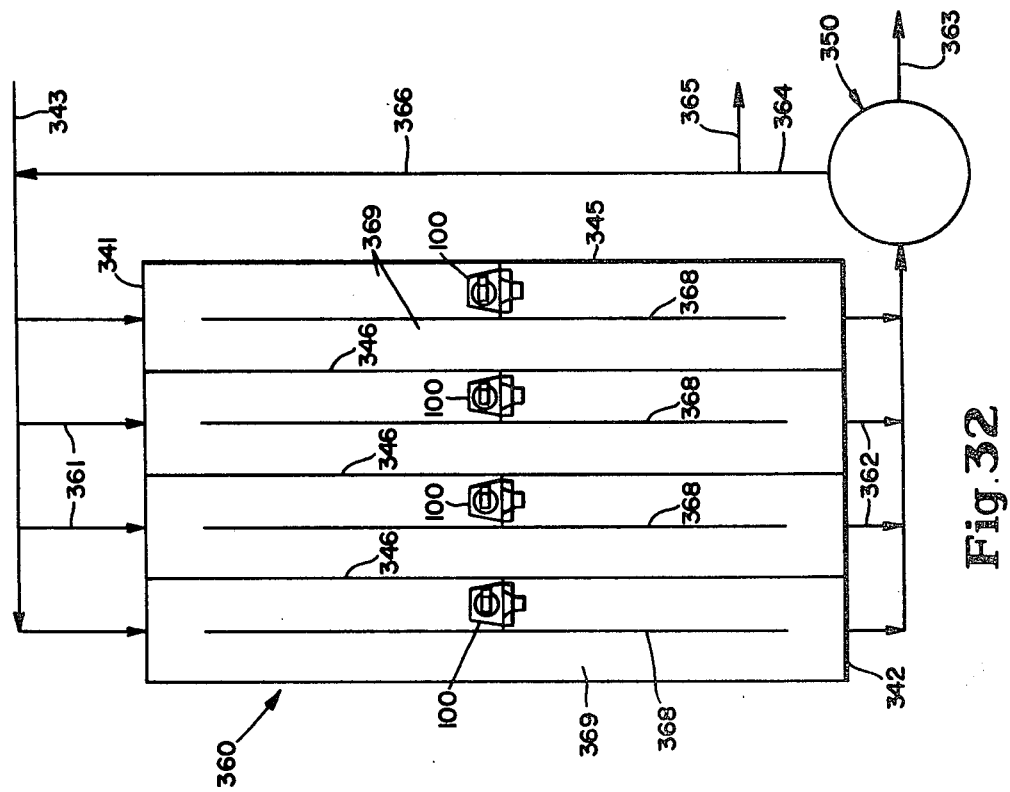

Although circulator/aerators 100 are shown in FIG. 32, it is equally feasible to substitute circulator/aerators 200, 271, 273, 275, 330 therefor. In other words, either a ducted-barrier or a stepped-barrier assembly is feasible in the barrier oxidation ditches of FIGS. 18, 23, 24, 26, 36, and 32. Moreover, any circulator/aerator 100, 200, 271, 273, 275, 331 can be combined with an array of static aerators that are sealably attached to a horizontal or slanted barrier which is disposed above a body of mixed liquor in flow connection with the upstream liquor.

While the foregoing embodiments are preferred, it is to be understood that numerous modifications and variations may be made therein by those skilled in the art and it is intended to cover in the appended claims all such modifications and variations as fall within the principles and scope of the invention.

What is claimed is:
1. A method for converting a reactor basin on an activated sludge process from a plug-flow or complete mix configuration to an oxidation-ditch configuration, said method comprising:
   A. forming an endless channel within said basin, said endless channel having parallel sides and a floor and being annular in shape;

B. placing a barriered circulator/aerator within said endless channel, said circulator/aerator comprising:
1. a barrier means for: (a) separating mixed liquor, within said channel and in the vicinity of said circulator/aerator, into upstream liquor within an intake channel and downstream liquor within a discharge channel, and (b) providing hydraulic support to said downstream liquor,
2. a flow passage which connects said upstream liquor to said downstream liquor,
3. a pump means for propelling up to all of said upstream liquor through said flow passage from said intake channel to said discharge channel, and
4. an aeration means for dispersing an oxygen-containing gas into said upstream liquor to form freshly aerated mixed liquor, said aeration means being disposed to contact said upstream liquor after the upstream liquor has entered said flow passage and before the upstream liquor has become said downstream liquor, and C. selectively and independently operating said pump means and said aeration means in order to:
1. prevent backmixing of said freshly aerated mixed liquor to said aeration means;
2. homogeneously aerate said upstream liquor being pumped through said flow passage;
3. selectively adjust the lengths of an aerobic zone and an anoxic zone which are formed in said endless channel, downstream of said barrier means; and
4. translationally propel said freshly aerated mixed liquor through said aerobic zone and through said anoxic zone for a selected distance, wherein said endless channel is annular in shape.

2. The method of claim 1, wherein effluent from said annular endless channel is discharged to a circular clarifier which is disposed within said annular channel.

3. The method of claim 1, wherein said circulator/aerator is a ducted-barrier circulator/aerator which comprises:
A. a pump assembly which comprises:
1. a motor,
2. a shaft which is rotated by said motor, and
3. an impeller which is attached to said shaft;
B. a mixing and aeration assembly which comprises:
1. a downdraft tube within which said impeller revolves, and
2. an air sparge device which is disposed within said downdraft tube and below said impeller;
C. a horizontally disposed duct, having an intake end and a discharge end, which is connected to said downdraft tube at said intake end; and
D. a barrier which is attached to said duct and disposed transversely thereto, whereby said barrier separates said discharge end from said downdraft tube.

4. The method of claim 1, wherein said circulator/aerator is a stepped-barrier circulator/aerator which comprises:
A. a draft tube having one end in flow connection with said upstream liquor;
B. a horizontally disposed barrier which comprises:
1. an upstream edge,
2. a downstream edge, and
3. a pair of side edges which are sealably attached to said parallel sides of said channel;
C. a first vertically disposed barrier which is sealably attached to said upstream edge; and
D. a second vertically disposed barrier which is sealably attached to said downstream edge.

5. The method of claim 1 which further comprises prefabricating and lowering said circulator/aerator into said annular endless channel.

6. A method for converting an annular reactor basin of an activated sludge system to an oxidation ditch configuration, said annular basin having sides and a floor therebetween and forming an annular channel, said method comprising the following steps:
A. pre-fabricating a barriered circulator/aerator, having:
1. a barrier with side edges, a width equalling the distance between said sides, and a bottom edge substantially coinciding with the surface of said floor,
2. a discharge duct to which said barrier is rigidly and sealably attached and which passes through said barrier,
3. an axial-flow pump which is disposed within said discharge duct, and
4. an aeration means which is disposed within said duct;
B. lowering said barriered circulator/aerator into said annular basin while said annular basin contains mixed liquor so that said side edges contact said sides and said bottom edge contacts said bottom, whereby said barrier divides said annular basin into an intake channel and a discharge channel; and
C. operating said axial-flow pump and said aeration means so that said mixed liquor enters said discharge duct from said intake channel in substantially anoxic condition and is discharged into said discharge channel as freshly aerated mixed liquor which circulates through the annular channel formed from said annular basin and reaches said barriered circulator/aerator in said anoxic condition.

7. The method of claim 1, wherein steps B and C are performed quickly enough that biomass in said mixed liquor is substantially alive when said pump and said aeration means begin to operate.

8. The method of claim 1, wherein said side edges and said bottom edge are provided with seal strips.

* * * * *